United States Patent [19]

Domen et al.

[11] Patent Number: 5,504,676
[45] Date of Patent: Apr. 2, 1996

[54] SLIP PROCESSING METHOD PROCESSING DATA FROM SLIPS WITH VARYING FORMATS

[75] Inventors: Singi Domen, Fujisawa; Kaori Kondoh, Yamato; Koichi Yamano, Tama; Shinobu Koizumi, Sagamihara; Rie Kobayashi, Tokyo; Koichi Taguchi, Zama; Hiroshi Koike, Sagamihara; Hidehiro Oomae; Masashi Amano, both of Yokohama; Hiroyuki Maezawa, Tama; Hiroshi Isobe, Zushi; Ryoichi Sasaki, Fujisawa, all of Japan

[73] Assignee: Hitachi, Ltd., Tokyo, Japan

[21] Appl. No.: 249,760

[22] Filed: May 26, 1994

[30] Foreign Application Priority Data

Jun. 8, 1993 [JP] Japan .................................. 5-137244

[51] Int. Cl.⁶ .................................................. G06F 17/30
[52] U.S. Cl. .................................................. 364/406
[58] Field of Search ................... 395/148, 149, 395/600; 364/401, 406, 419, 19

[56] References Cited

U.S. PATENT DOCUMENTS 5,202,984  4/1993  Kashio ............................ 395/600
5,299,304  3/1994  Williams et al. ................. 395/148

FOREIGN PATENT DOCUMENTS 62-248064  10/1987  Japan .
1-38869   2/1989   Japan .
1-231172  9/1989   Japan .
2-24778   1/1990   Japan .

OTHER PUBLICATIONS

Lotus 1-2-3 Product Catalog, Lotus Development Corporation, 1992. (Provided in Japanese—English translation unavailable).
WINGZ Product Catalog, ASCII Corporation. (Provided in Japanese—English translation unavailable).
EG Form Product Catalog, ERGOSOFT Corporation. (Provided in Japanese—English translation unavailable).
Asakura, Y. "Feature and Advantage of the Fourth Generation Language, UNISYS Japan LINC/MAPPER," Business and Management, Apr. 1991, pp. 8–9. (Provided in Japanese—English translation unavailable).

*Primary Examiner*—Donald E. McElheny, Jr.
*Attorney, Agent, or Firm*—Fay, Sharpe, Beall, Fagan, Minnich & McKee

[57] ABSTRACT

A slip processing method for simplifying a processing of a job which uses a form of a predetermined format at a frequency of once a long term such as month, quarter or year and in which an input form is changed at a frequency of once per several times of use. The method comprises storing format information of an input form and data information in one file, providing a format of the input form including a plurality of tables each comprising a plurality of items (cells), storing data in corresponding ones of the items, executing a retrieval of the items and a totalization of data in the items with referencing a file which stores the format information and the data of the input form and storing the format information and the data of the input form and the processed information in a form which is transmittable through a network.

16 Claims, 35 Drawing Sheets

FIG. 3

ORDERING SLIP

| DEPARTMENT CODE | DEPARTMENT NAME | | TRANSFER NUMBER | ORDER NUMBER |
|---|---|---|---|---|

| SLIP NUMBER | | DATE | | PERSON IN CHARGE | | REMARK | |

| ITEM | CODE | | | | | | |
|---|---|---|---|---|---|---|---|
| GOODS | NAME | | | | | | |
| | UNIT | | | | | | |
| | UNIT PRICE | | | | | | |
| | VOLUME | | | | | | |
| AMOUNT OF MONEY | | | | | | | |

TOTAL AMOUNT OF MONEY

FIG. 5B

ORDERING SLIP TOTALIZATION TABLE /70

| ITEM | CODE | NAME | VOLUME | UNIT PRICE | AMOUNT OF MONEY |
|------|------|------|--------|------------|-----------------|
| 031 | 001 | A4-SIZE NOTEBOOK | 15 | 100 | 1500 |
| 031 | 005 | HB-TYPE PENCIL | 8 | 600 | 4800 |

| TOTAL AMOUNT OF MONEY | 6300 |
|---|---|

/71

PROCESSING OF ORDERING SLIP TOTALIZATION TABLE

```
DEF {
    ( * : GOODS : CODE)                              (2.1)
    {
      CODE = * : GOODS : CODE                        (2.2)
      ITEM = * : ITEM                                (2.3)
      NAME = * : GOODS : NAME                        (2.4)
      VOLUME = * : VOLUME                            (2.5)
      UNIT PRICE = * : GOODS : UNIT PRICE            (2.6)
      AMOUNT OF MONEY = @SUM( * : AMOUNT OF MONEY)   (2.7)
    }
    TOTAL AMOUNT OF MONEY = @SUM( * : TOTAL AMOUNT OF MONEY)  (2.8)
}
```

ORDERING SLIP (72)

| DEPARTMENT CODE | DEPARTMENT NAME | TRANSFER NUMBER | ORDER NUMBER |
|---|---|---|---|
| 101 | DEVELOPMENT DIVISION #1 | 010 | 1325 |

| SLIP NUMBER | DATE | PERSON IN CHARGE | REMARK |
|---|---|---|---|
| 2010 | 94/3/10 | YUMIKO SUZUKI | |

| ITEM | | GOODS | | | VOLUME | AMOUNT OF MONEY |
|---|---|---|---|---|---|---|
| | CODE | NAME | UNIT | UNIT PRICE | | |
| 031 | 001 | A-4 SIZE NOTEBOOK | SATSU | 100 | 10 | 1000 |
| 031 | 005 | HB-TYPE PENCIL | DOZEN | 600 | 3 | 1800 |

TOTAL AMOUNT OF MONEY: 2800

ORDERING SLIP B (73)

| DEPARTMENT CODE | DEPARTMENT NAME | TRANSFER NUMBER | ORDER NUMBER |
|---|---|---|---|
| 202 | ENGINEERING DIVISION #2 | 020 | 1255 |

| SLIP NUMBER | DATE | PERSON IN CHARGE | REMARK |
|---|---|---|---|
| 1010 | 94/3/15 | KAZUKO YAMAMOTO | |

| ITEM | | GOODS | | |
|---|---|---|---|---|
| | CODE | NAME | | |
| 031 | 001 | A-4 SIZE NOTEBOOK | | |
| 031 | 005 | HB-TYPE PENCIL | | |

| | UNIT | SATSU | DOZEN |
|---|---|---|---|
| | UNIT PRICE | 100 | 600 |
| | VOLUME | 5 | 5 |
| | AMOUNT OF MONEY | 500 | 3000 |

TOTAL AMOUNT OF MONEY: 3500

TOTALIZATION →

1 generate FM18318651, FormTmpl, x=0, y=0, width=700, height=500, left_top_radius=0, right_top_radius=0, left_bottom_radius=0, right_bottom_radius=0, floating=0, form_name=test2, nmr_of_tables=1, tablelist=nil, nmr_of_textpanes=1, textpanelist=nil, nmr_of_graphs=0, graphlist=nil, nmr_of_other_strings=0, other_strings=nil, nmr_of_other_lines=0, other_line=nil, form_count=0 ;

2 generate T18318651, TableTmpl, parent=FM18318651, x=71, y=102, width=378, height=89, left_top_radius=10, right_top_radius=10, left_bottom_radius=10, right_bottom_radius=10, line_type=0, line_width=3, line_color=0, dimension=0, main_tablehead=0, effective=false, back_slash=false, instance= , display_th=true, display_ts=false, table_count=18318651 ;

3 generate F18318651, FRAME, TP=T18318651, KHLNUM=2, KVLNUM=1, IHLNUM=1, IVLNUM=2, HCNUM=2, SCNUM=1, CCNUM=2 ;

4 generate TH18318651, TableHeadTmpl, parent=T18318651, x=71, y=102, width=378, height=45, line_type=0, line_width=2, line_color=0, lower_limit=0, upper_limit=1, column=2, THINUM=2, tablehead_item=nil ;

5 generate HHL18318651, HHLINE, FR=F18318651, VL1=FVL118318651, VL2=FVL218318651, TP=T18318651, THP=TH18318651, DY=0, 505600 ;

6 generate TS18318651, TableSideTmpl, parent=T18318651, x=71, y=147, width=0, height=44, line_type=0, line_width=2, line_color=0, lower_limit=0, upper_limit=0, row=1, TSINUM=1, tableside_item=nil ;

7 generate SVL18318651, SVLINE, FR=F18318651, HL1=FHL118318651, HL2=FHL218318651, TP=T18318651, TSP=TS18318651, DX=0, 00000 ;

8 generate TH18318651000, TableHeadItem1, parent=TH18318651, table=T18318651, tablehead=TH18318651, x=71, y=102, width=189, height=45, line_type=0, line_width=1, line_color=0, item_color=0, item_x=0, item_y=0, item_name=department code, item_pack=0, item_fontid=0, item_size=0, item_color=0, item_line_mode=1, data_kind=0, io=0, round=false, char_pack=0, char_fontid=0, char_size=16, char_color=0, char_blink=false, char_reverse=false, char_column=0, char_line_mode=0, level=0, hierarchical_line_type=0, hierarchical_line_width=2, hierarchical_line_color=0, column=0, tablehead_item=nil, item_adjust=1, item_layout=0, item_charover=0, item_lineover=1, item_inmode=0, item_charpitch=0, item_linepitch=  , fposition=0, char_charover=1, char_lineover=1, char_inmode=1, char_layout=0, char_format=0, fsymbol= , char_charspace=0, char_linespace=0 ;

9 generate THI1831865101, TableHeadItemTmpl, parent=TH18318651, table=T18318651, tablehead=TH18318651, X=260, y=102, width=189, height=45, line_type=0, line_width=1, line_color=0, item_x=0, item_y=0, item_name="department name", item_pack=0, item_fontid=0, item_size=0, item_color=0, item_line_mode=1, data_kind=0, io=0, round=false, char_pack=0, char_fontid=0, char_size=16, char_color=0, char_blink=false, char_reverse=false, char_column=0, char_line_mode=0, level=0,hierarchical_line_type=0, hierarchical_line_width=2,hierarchical_line_color=0, column=0, tablehead_item=nil, item_adjust=1, item_layout=0, item_charover=3, item_lineover=1, item_inmode=0, item_charpitch=0, item_linepitch=0, item_charspace=0, item_linespace=0, char_adjust=1, char_layout=0, char_format=0, fsymbol="", fposition=0, char_charover=1, char_lineover=1, char_inmode=1, char_charpitch=0, char_linepitch=0, char_charspace=0, char_linespace=0 ;

10 generate TSI1831865100, TablesideItemTmpl, parent=TS18318651, table=T18318651, tableside=TS18318651, X=71, y=147, width=0, height=44, line_type=0, line_width=1, line_color=0, item_x=0, item_y=0, item_name="item 01", item_pack=0, item_fontid=0, item_size=0, item_color=0, item_line_mode=1, data_kind=0, io=0, round=false, char_pack=0, char_fontid=0, char_size=16, char_color=0, char_blink=false, char_reverse=false, char_column=0, char_line_mode=0, level=0,hierarchical_line_type=0, hierarchical_line_width=2,hierarchical_line_color=0, row=0, tableside_item=nil, item_adjust=1, item_layout=0, item_charover=3, item_lineover=1, item_inmode=0, item_charpitch=0, item_linepitch=0, item_charspace=0, item_linespace=0, char_adjust=1, char_layout=0, char_format=0, fsymbol="", fposition=0, char_charover=1, char_lineover=1, char_inmode=1, char_charpitch=0, char_linepitch=0, char_charspace=0, char_linespace=0 ;

11 generate TB1831865100, TableBodyTmpl, parent=T18318651, tablehead=TH18318651, tableside=TS18318651, data_top=2896520, scroll=0, TCNUM=2 ;

12 generate TC1831865100, TableContentTmpl, parent=TB1831865100, tablehead_item=THI1831865101, tableside_item=TSI1831865100, hatch_code=0, hatch_color=0 ;

13 generate TC1831865100, TableContentTmpl, parent=TB1831865100, tablehead_item=THI1831865101, tableside_item=TSI1831865100, hatch_code=0, hatch_color=0 ;

14 ", display_dt=true,tablehead_item=THI1831865101, tableside_item=TSI1831865100, hatch_code=0, hatch_color=0 ;

15 generate Text1831832582, TextPane, X=18.750000, Y=9.500000, width=68.250000, Height 13,25000, Str="ordering slip", Vmargin=1.00000, Hmargin=1,00000, Fcolor=1, Ftype=1, Fwidth=1, Scolor=0, Sfont=1, Csize=24, speak=0, Mode=1, Adjust=1, Layout=0, Charover=3, Lineover=1, Inmode=0, Charpitch=0, Linepitch=0, Charspace=0, Linespace=0 ;

16 set T18318651 : tablehead, TH18318651 ;
17 set T18318651 : tableside, TS18318651 ;
18 set T18318651 : tablebody, TB1831865100 ;
19 set THI1831865100 : table_content, TC1831865100 ;

OAsquare

| FILE | EDIT | MODE | SHEET | OPTION | HELP |

GOODS : UNIT =@MATCH(GOODS : CODE GOODS CODE TABLE. CODE, UNIT)

ORDERING SLIP

| DEPARTMENT CODE | DEPARTMENT NAME |

| SLIP NUMBER | DATE | PERSON IN CHARGE |

| TRANSFER NUMBER | ORDER NUMBER |

REMARK

TABLE PREPARATION PARAMETER SETTING

NUMBER OF CELLS __×__

TABLE HEAD  YES  NO

TABLE SIDE  YES  NO

SET   CANCEL

| VIEW TABLE | FUNC-TION |
| CONTROL STATEMENT | CALCU-LATION |
| COMMAND | |
| SELECT | SUB-STITUTE |

64

FIG. 25
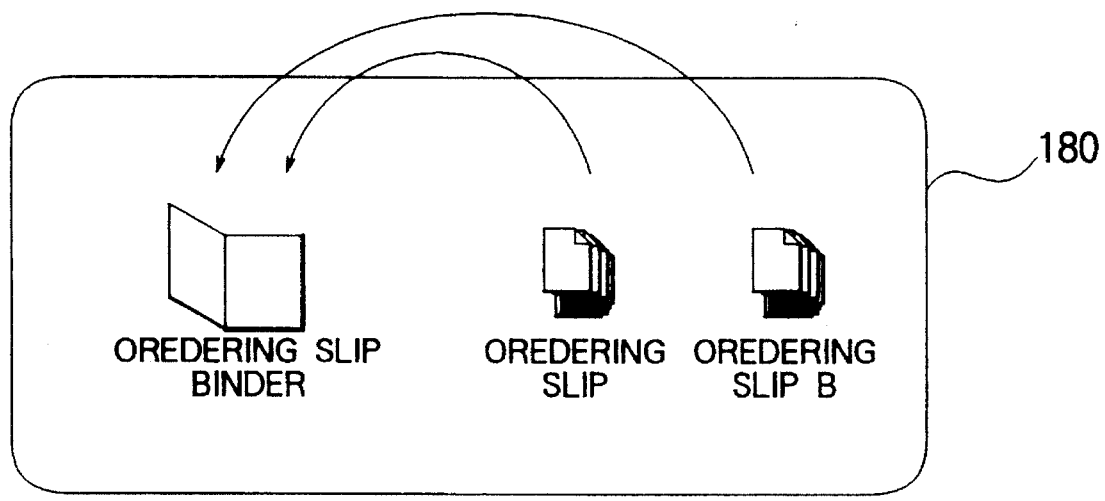
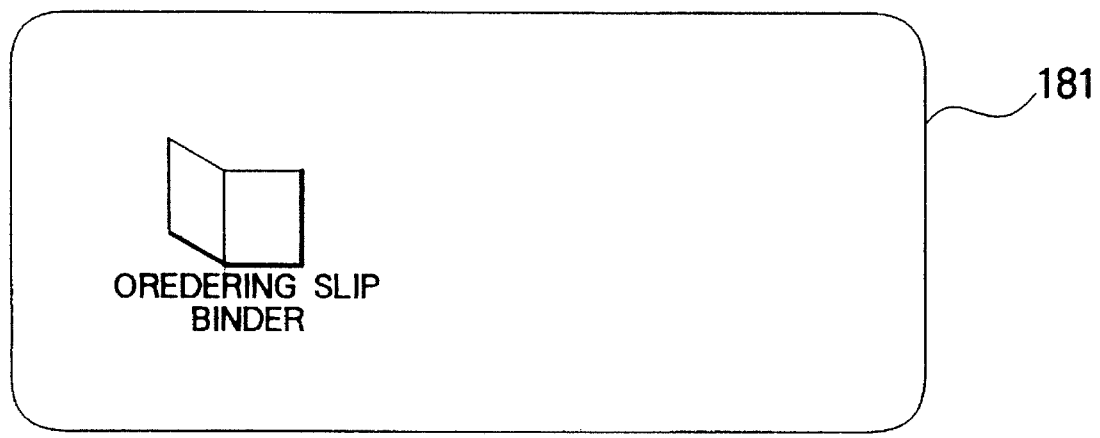

FIG. 30

| SLIP NAME TO BE SEARCHED : | ORDERING SLIP* |
|---|---|
| BINDER NAME TO BE SEARCHED : | |
| SEARCH EXTENT : | OWN WS, ALL WS'S, SPECIFIED WS |
| SEARCH ITEM NAME : | PERSON IN CHARGE |
| SEARCH CONDITION : | YUMIKO SUZUKI |

FIG. 32

SLIP NAME :

BINDER NAME :

SCOPE : OWN WS, ALL WS'S, SPECIFIED WS

ITEM : AMOUNT OF MONEY

PROCESS : AMOUNT OF MONEY * 0.8

ORDERING SLIP *

SLIP PROCESSING METHOD PROCESSING DATA FROM SLIPS WITH VARYING FORMATS

BACKGROUND OF THE INVENTION

1. Field of the Invention

The present invention relates to office processing by a computer, and more particularly to a slip processing method which may be suitably applied to the automation of job processing performed by a plurality of persons or departments in which a frequency of use is several times per long term such as month, quarter of a year or year and a frequency of update of specification is once per several times of use.

2. Description of the Related Art

A prior art job processing computer is classified into two types, a formatted job type and an non-fixed forms of business process type, and software is provided for each type. In the "fixed forms of business process", slips of the same format are daily and repeatedly used and it corresponds to stem job such as sales management and inventory management. In the "non-fixed forms of business process", a document which will be used only once is prepared and it corresponds to word processing or decision making support system.

However, common office jobs include a job in which, while forms of a predetermined input format are used, the frequency of use is once per long term such as month, quarter or year and the input format is updated once per several times of use. Such a job is called a "quasi-formatted job". The forms used in the quasi-formatted job are handled by a plurality of persons and handling procedures may vary from office to office. As a result, even if an attempt to computerize the job is made to save manpower, too much cost is required to develop and modify the system and the computerization in this field is behind. Prior art for reducing the cost required to develop and modify the system includes the fourth generation language (4 GL), spread sheet software and formatted document preparation software. Typical products of the 4GL are LINC and MAPPER of UNISYS. Typical products of the spread sheet are Lotus 1-2-3 of Lotus Development and Wingz of Informix. A typical product of the formatted document preparation software is EGForm of ERGOSOFT Corp. MVA of SAS Institute Japan is one of groupware-oriented job softwares having data compatibility with another systems.

The "quasi-formatted job" in the prior art are characterized by:

(1) An input form of a predetermined format is used.
(2) Inputted forms are processed by to a plurality of members in an office for totalization.
(3) Though the input forms are used at a frequency of several times per long term such as month, quarter or year, the format of the input forms is non-periodically revised every time processing or organization are modified. Namely, the format of the input forms changes to some extent for each use.
(4) In many case, data in a form are used in a processing with respect to the form. Thus, data in another forms are rarely used.

When a system for the quasi-formatted job is developed, the following conditions are required.

(1) An input form with a free style format including a plurality of tables can be defined.
(2) The forms can be totalized without using a database.
(3) The forms can be transmitted through a VAN.

In the prior art 4GL, an input form of a predetermined format is used and the data is calculated on the database by using the database. The prior art UNISYS LINC aims to develop a comprehensive information system based on an on-line database system with cooperation of an end user. It is characterized by that fundamental portions of the database and the processing logic are automatically generated by merely defining the display format. When the system for computerizing the quasi-formatted job by using the LINC, the input form is defined by using the display format define function and the structure of the database depends on the specification of the input form.

However, in the quasi-formatted job, the specification of the input form is frequently changed, and each time the input form is changed, the structure of the database must also be changed. The database is intended to save or reuse the data but it is unnecessary function to the quasi-formatted job, and the job is slowed if the reconfiguration of the database is made each time the input form is changed. Accordingly, it is difficult to effect the processing with the database and the LINC is not suitable for a tool in developing the system for computerizing the quasi-formatted job.

The UNISYS MAPPER is intended to realize high end information processing which requires experts of job and management, by a leader ship of an end user. The MAPPER is suitable to the mechanization of job which has heretofore been difficult to computerize because of small quantity and large number of types and the mechanization unique to the department. In a specific operation method, a command is issued from a terminal to the database to process the database so that desired information is prepared. The prepared form may be transmitted to other work station by an electronic mail.

However, the preparation of the form is limited to the data in the database or the data which the user interactively enters, and the totalization based on the data of the forms prepared by the user is not attained. Accordingly, the MAPPER is not a suitable tool for developing the system for computerizing the quasi-formatted job. (Reference is made to "Feature and Advantages of the Fourth Generation Language, UNISYS Japan LINC/MAPPER" BUSINESS AND MANAGEMENT, 1991 April, pp 8–9).

The spread sheet is known as means for computerizing the quasi-formatted job without using the database. An object of the spread sheet is a tabulation function and graphic representation thereof. While the tabulation function is perfect, it is not possible to prepare an entry form comprising a set of tables because it is intended to calculate on a single table. The Lotus 1-2-3 allows the skewer operation in which various operations are performed for corresponding data among a plurality of forms, but the formats of the forms must be totally identical because the skewer operation is attained by a three-dimensional data processing function. (Reference is made to Lotus product catalogue)

The Informix Wingz can simultaneously display a plurality of forms on multi-windows to skewer a plurality of data but it does not have the skewer operation function. (Reference is made to Wingz product catalogue)

Thus, the prior art is not suitable for the quasi-formatted job because it lacks the following function.
Make totalization or prepare a list for a plurality of forms of non-uniform formats.
Display a plurality of tables on one form without regard to the number of lines and the number of digits.

The ERGOSOFT EGForm is intended to prepare a format of a slip. The format preparation function of the EGForm is superior to that of the spread sheet and it has a function of add, subtract, multiply and divide. The EGForm includes an image for saving a plurality of documents of the same format and can centrally manage a plurality of forms and retrieve, extract and rearrange the forms. However, the EGForm cannot centrally manage slips of different formats and it does not have the skewer operation function, unlike the spread sheet, because it is intended to issue and print the slips. (Reference is made to EGForm product catalogue)

The application system SAS Institute MVA which allows the execution of the job processing independently from the hardware includes the decision making support as a main function. (Reference is made to MVA product catalogue)

The prior art used in the commercially available products has been described above. Related prior art is described below.

Invention relating to a free style format (JP-A-62-248064)

Text information and information on a slip are stored in two independent formats, and they are managed by an overlay management unit to change a layout of the slip as required to calculate among cells and calculate a plurality of slips. A plurality of tables can be displayed on a screen but the calculation of the slips is limited to the slips having the same format.

Invention relating to distribution of slips (JP-A-64-38869)

Format information and entry data are separated and only the entry data is transmitted so that the amount of data transmitted is reduced to improve the response of the system. Since the format information is stored in each terminal, the totalization of entry data from terminals having different slip formats is not allowed.

Invention relating to data processing by-using a plurality of tables (JP-A-1-231172)

In an office computer, a user specifies a plurality of slip files and output locations thereof and the specified slip files are outputted to the specified output locations on one page so that desired data is readily generated to comprehensively determine the content of the account job. The data of a plurality of slip files (tables) are processed for easy look-out and it is displayed on the screen but the simultaneous processing of the plurality of slip file (tables) is not attained.

Invention relating to totalization (JP-A-2-24778)

Data are totalized based on a pre-defined totalization level and it is temporarily stored, and the types of data to be outputted, of the stored data ares specified so that the data can be totalized by the simple setting operation to specify the types of data to be totalized. It is necessary to define an upper totalization level by defining means and the totalization level depends on the types of files which store the data. Accordingly, it is not suitable to the quasi-formatted job in which the types of files which store the data are frequently changed.

SUMMARY OF THE INVENTION

It is an object of the present invention to provide a slip processing method which may simplify job in which forms of a predetermined input format are used and a frequency of use thereof is once per long term such as month, quarter or year and the input format is changed at a frequency of once per several times of use.

In order to achieve the above object, the present invention performs the following processing by using a computer.

(1) Format information and data information of the entry form are stored in one file with the format of the entry form comprising a plurality of tables and, each table comprising a plurality of entries (cells) and data is stored for each item.

(2) Retrieval and totalization are performed by referencing the files.

(3) The format information of the form on which the totalization data is to be entered, the totalization data and the process information in the totalization are stored in a form transferrable on a network.

When the process including item names is to be executed, the file which describes the process content is referenced to determine a process formula to be executed. The item name of the data to be referenced is determined and the format of the corresponding slip and the data storage file are read. Since the data storage file manages the relation between the data and the format by the item name, the data is retrieved from the item name to execute the process formula.

BRIEF DESCRIPTION THE DRAWINGS

FIG. 1 shows an example of a job processing slip used in an embodiment and a relation between format definition information and a data storage file, FIG. 2 shows a network environment which is a work environment of the embodiment, FIG. 3 shows a modification of a slip format, FIG. 4 shows an example of slip job processing and processing information thereof, FIG. 5A shows an example of a totalization table and processing information thereof, FIG. 5B shows a detailed figure of the totalization table and processing information shown in FIG. 5A, FIG. 5C shows contents of the ordering slip A, B shown in FIG. 5A, FIG. 6 shows an example of a slip management file, FIG. 7 shows a portion of a slip format, FIG. 8 shows slip format definition information and a data storage file, FIG. 9 shows slip format definition information and a data storage file, FIG. 10 shows a system configuration of the present invention, FIG. 11 shows a slip format and a definition flow chart of processing information in the present invention, FIG. 12 shows a format definition screen, FIG. 13 shows a processing information definition screen, FIG. 14 shows a map which develops the slip format definition information and the data storage file on a memory, FIG. 15 shows a map which develops the slip format definition information of FIG. 7 and the data storage file on a memory, FIG. 16 shoes an initial state of information held in each work station, FIG. 17 shows a process procedure for issuing an ordering slip, FIG. 18 shows a status of a slip management file, FIG. 19 shows information in issuing a slip at a slip entry terminal-A, FIG. 20 shows information in designating transfer of a slip at the slip entry terminal-A, FIG. 21 shows information in preparing an ordering slip at a slip entry terminal-B, FIG. 22 shows information in issuing an ordering slip at the slip entry terminal-B, FIG. 23 shows information in designating transfer of a slip at the slip entry terminal-B, FIG. 24 shows a flow chart illustrating an embodiment, FIG. 25 shows an interactive console screen, FIG. 26 shows information in preparing a totalization table at a totalization terminal, FIG. 27 shows a detailed flow chart of a slip data access unit 110, FIG. 28 shows a map which develops a slip format definition information 172 of FIG. 20 and the data storage file on a memory, FIG. 29 shows a map which develops a slip format definition information 175 of FIG. 23 and the data storage file on a memory, FIG. 30 shows a retrieval condition setting screen, FIG. 31 shows a detailed flow chart of a process after the retrieval condition setting, FIG. 32 shows a process content setting screen, and FIG. 33 shows a process of totalization of slips.

DESCRIPTION OF THE PREFERRED EMBODIMENTS

Figure 1:
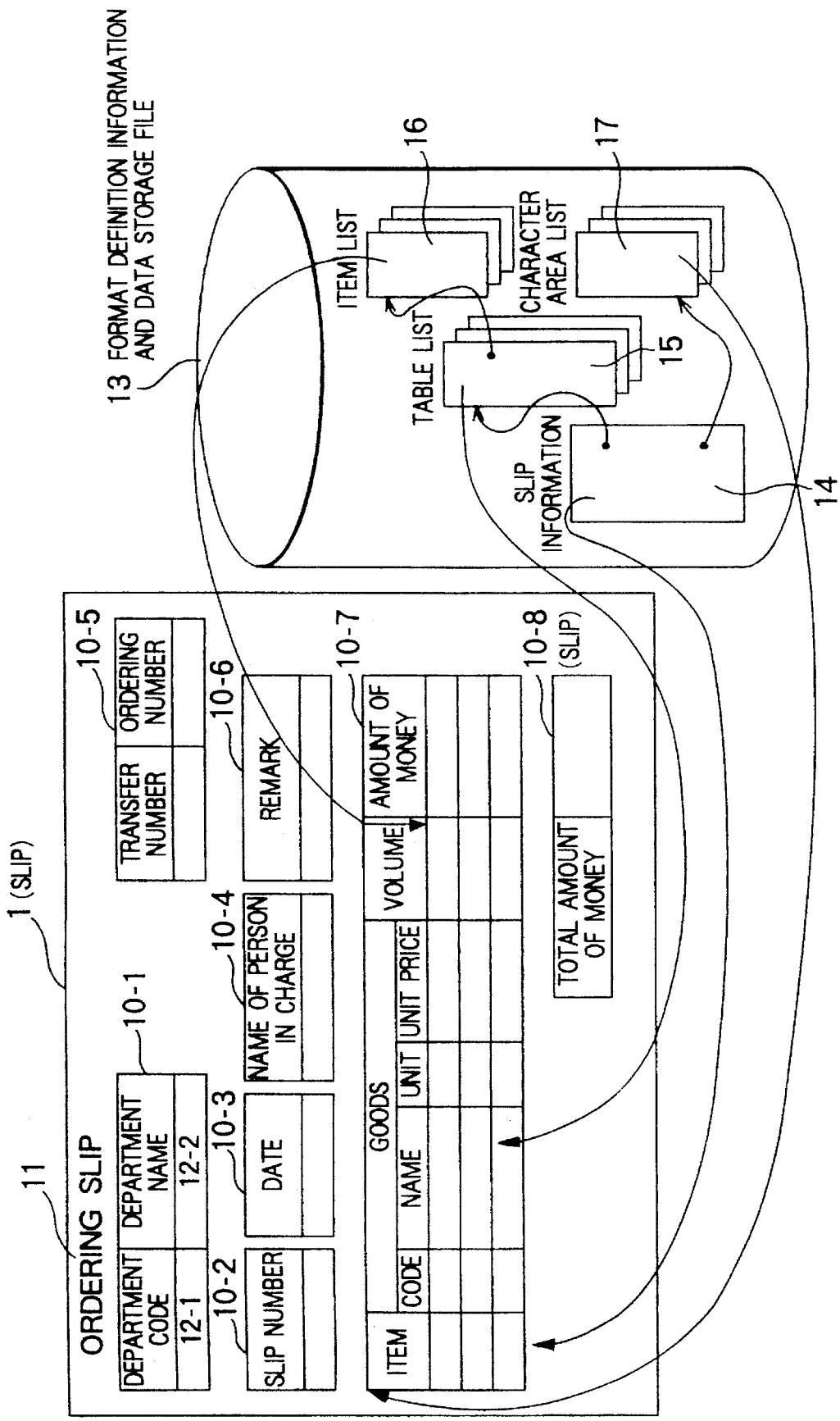

The present invention aims to office processing job using a slip 1 shown in FIG. 1 on a plurality of work stations in a network environment such as LAN, WAN or DDX. The slip 1 comprises at least one table and character strings such as an ordering slip 11. Each table comprises at least one item. For example, the slip 1 shown in FIG. 1 comprises 8 tables 10-1 to 10-8. Each item is a minimum unit to compose the slip 1 and data to be processed is stored in each item. The table 10-1 comprises two items, a department code 12-1 and a department code 12-2.

Internal information for processing the slip 1 in the computer forms a hierarchy structure comprising slip information 14, a table list 15, an item list 16 and a character area list 17, and data in each level is stored in a text data in a format definition information and data storage file 13. The slip information 14 contains information on a size and a name of the slip 1, the table list 15 contains information on sizes and display positions of tables (10-1 to 10-8) of the slip, the item list 16 contains information on items of the respective table, and the character area list 17 contains information on a character string such as the ordering slip 11.

Figure 2:
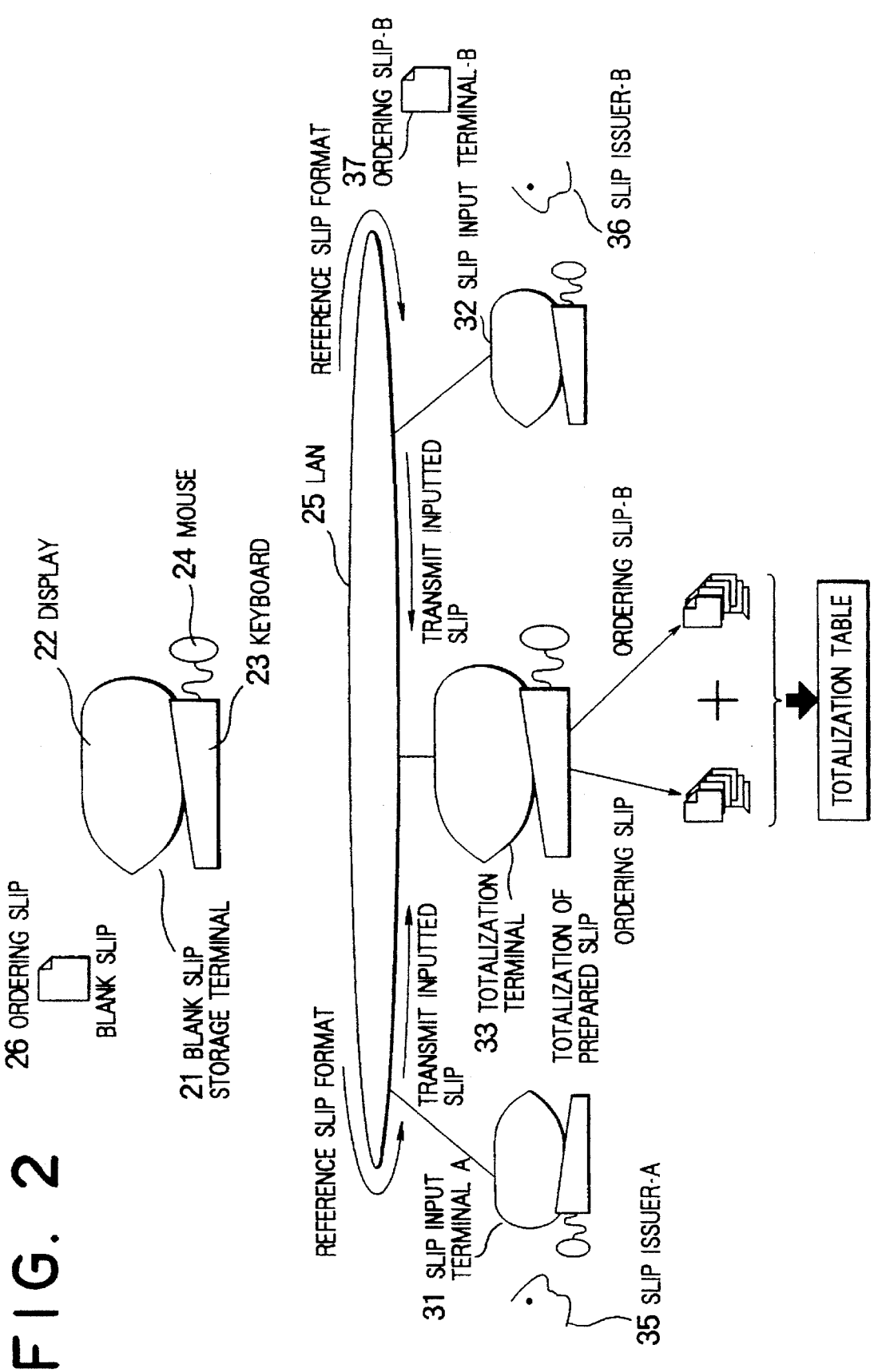

FIG. 2 shows an environment in which the present invention is implemented. Each of work stations 21, 31, 32 and 33 connected through a network such as a LAN has a display 22, a keyboard 23 and a mouse 24. In the present embodiment, the slip processing is performed in the LAN environment. As initial information (format and processing information) of the slip 1, an ordering slip 26 which is a blank slip is stored from a blank slip storage terminal 21. When a slip is designated and the execution of work is commanded by a slip issuer-A 35 on a slip input terminal-A 31 connected to the LAN 25, the initial information of the slip designated on the blank slip storage terminal 21 is referred and the format of the slip 1 is displayed on a display of the slip input terminal-A 31. The slip issuer-A 35 interactively enters data necessary for the slip while he/she watches the display to perform the work. When the slip transmission is commanded by the slip issuer-A 35, the inputted data is transferred to a totalization terminal 33 through the LAN 25. In the totalization terminal 33, when the start of a slip totalization program is commanded by a person in charge the totalization is performed in accordance with the transferred data.

In a prior art system aimed to issue and totalize the slip, where structures of a plurality of slips are different from each other, the data of those slips cannot be totalized. In the present invention, however, an ordering slip-B 37 of a different format than that of the ordering slip 26 prepared at the blank slip storage terminal 21 is prepared at a slip issuing terminal-B 32 as shown in FIG. 3. As a result, even if a slip issuer-B 36 conducts the same operation as the slip issuer-A 35 does, the transferred data is correlated at the totalization terminal 33 as a slip to be totalized and it is totalized. A set of slips to be totalized is hereinafter referred to as a binder.

Figure 4:
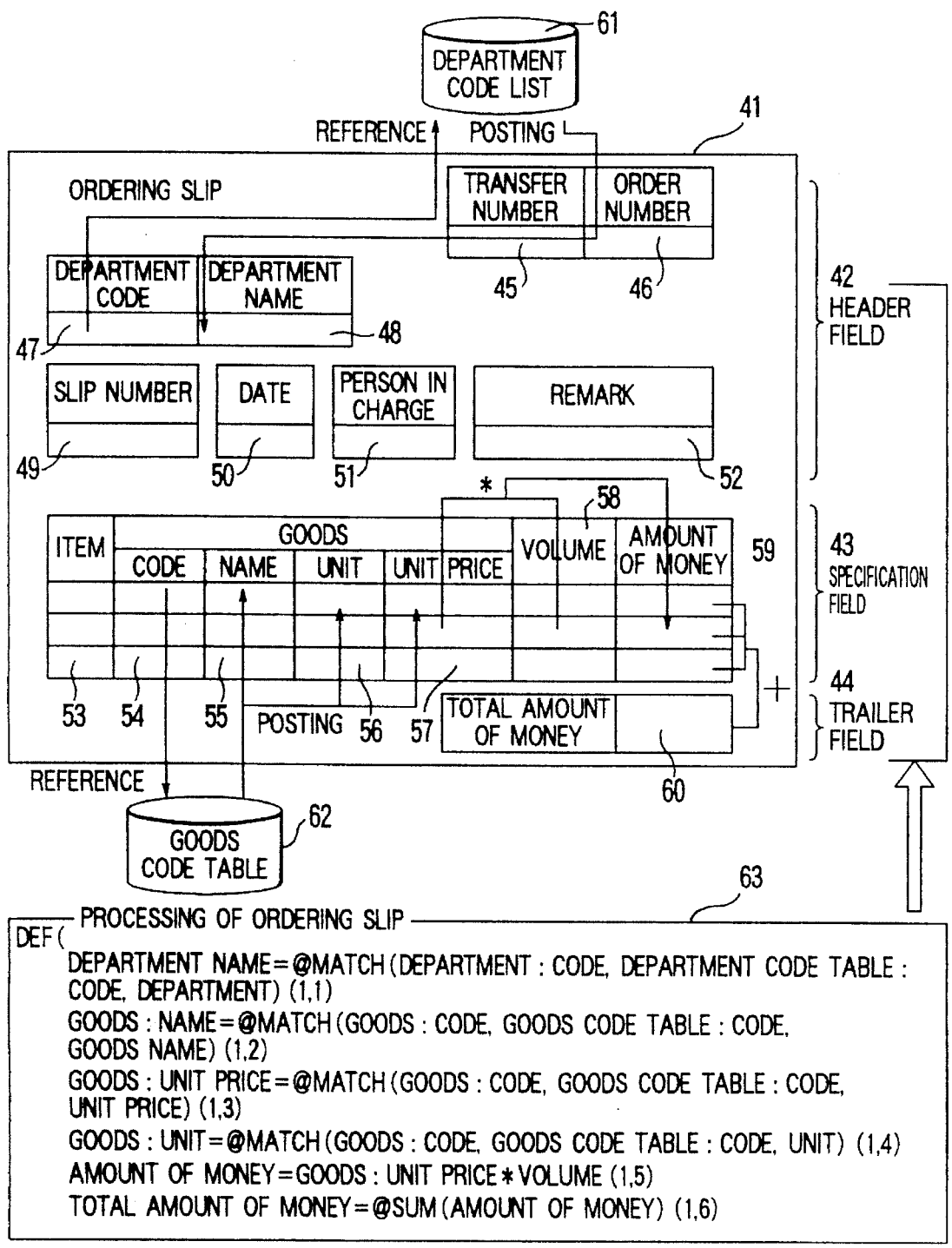

The slip issue job is now explained in accordance with an ordering slip 41 shown in FIG. 4. The ordering slip comprises a header field 42 in which information for identifying respective slips is entered, a specification field 43 in which data to be processed is entered, and a trailer field 44 in which data based on the specification field 43 is entered. The header field 43 comprises a transfer number 45, an ordering number 46, a department code 47, a department name 48, a slip number 49, a date 50, a person in charge 51 and a remark 52, the specification field 43 comprises a goods item 53, a code 54, a name 55, a unit 56, a unit price 57, an volume 58 and an amount of money 59, and the trailer field 44 comprises a total amount of money 60.

Data are entered in the transfer number 45 and the ordering number 46 of the header field 42. When data is entered into the department code 47, A department code table 61 is looked up by the department code 47 so that the department name 48 stored in the code table 61 is transferred to the ordering slip 41 and it is displayed. The information held in the system is displayed in the slip number 49, the date 50 and the person in charge 51. When data is entered in the item 53 and the code 54 of the specification field 43, a goods code table 62 is looked up and the name 55, the unit 56 and the unit price 57 stored in the goods code table 62 are transferred to the ordering slip 41 and displayed. When the data of the volume 58 is entered, a product with the unit price 57 is calculated as the amount of money 59 and displayed. The total amount of money is stored in the total amount of money 60 in the trailer field 44.

The above process is represented by a process formula 63 stored in the slip information 14. In the department name 48, the department name of the record corresponding to the code of the department code table 61 which corresponds to the department code 47 is displayed (1.1). In the goods name, the goods name of the record corresponding to the record of the goods code table 62 which corresponds to the goods code is displayed (1.2). The goods unit price (1.3) and the goods unit (1.4) are similarly displayed. In the amount of money, the product (1.5) of the unit price and the volume is entered, and in the total amount of money, the total amount of money (1.6) is entered.

Figure 5A:
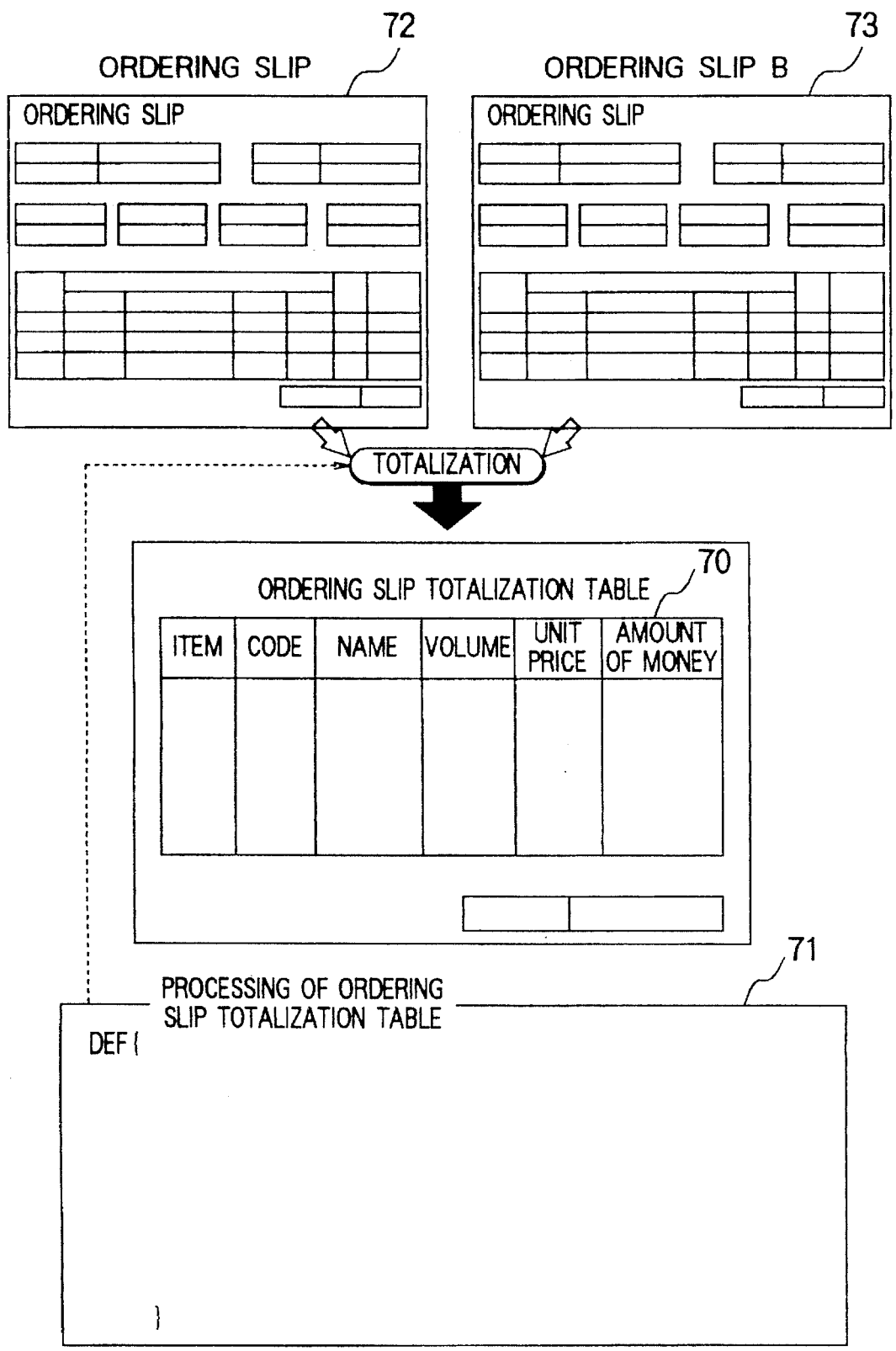

A totalization table 70 displayed on the totalization terminal 33 and a content 71 processed by the terminal 33 are shown in FIGS. 5A–C. Processing overview is shown in FIG. 5A. Slips and tables used in FIG. 5A are shown in detail in FIGS. 5B–C.

The following condition formula (2.1) is given to the totalization table 70 shown in FIG. 5B. A symbol * shown in the process content of FIG. 5B means that all slips stored in the binder are to be processed.

(*:goods:code)    (2.1)

By a definition 71 of FIG. 5B, data of an ordering slip 72 of FIG. 5A and an ordering slip-B 73 of FIG. 5A are totalized for each goods code (2.2–2.7). A total amount of money is calculated (2.8). The operation to calculate the total of the data of the slips is referred to as a skewed totalization and the formula (2.7) corresponds to the skewed totalization.

Figure 33:
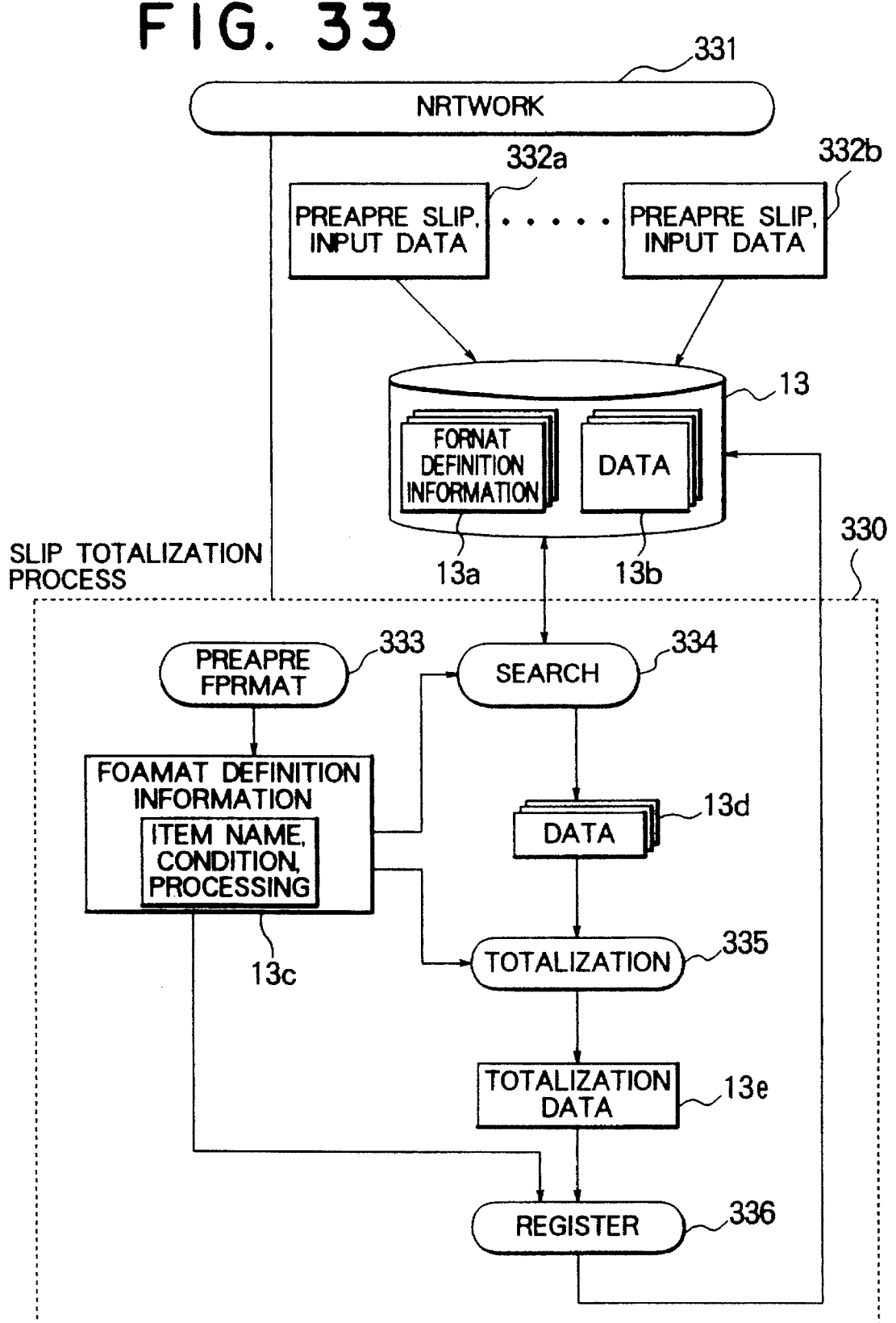

A ledger in which slips of different types entered from terminals of respective departments interconnected through a network 331 are totalized (skewed totalization) is registered as a new slip, as shown in FIG. 33. Format definition information 13*a* and data 13*b* of slips of different formats prepared by terminals 332*a* and 332*b* which prepare and enter data are stored in a file 13. The totalization of the slips is performed in the following procedure in a terminal 330 connected to the network 331.

Figure 24:
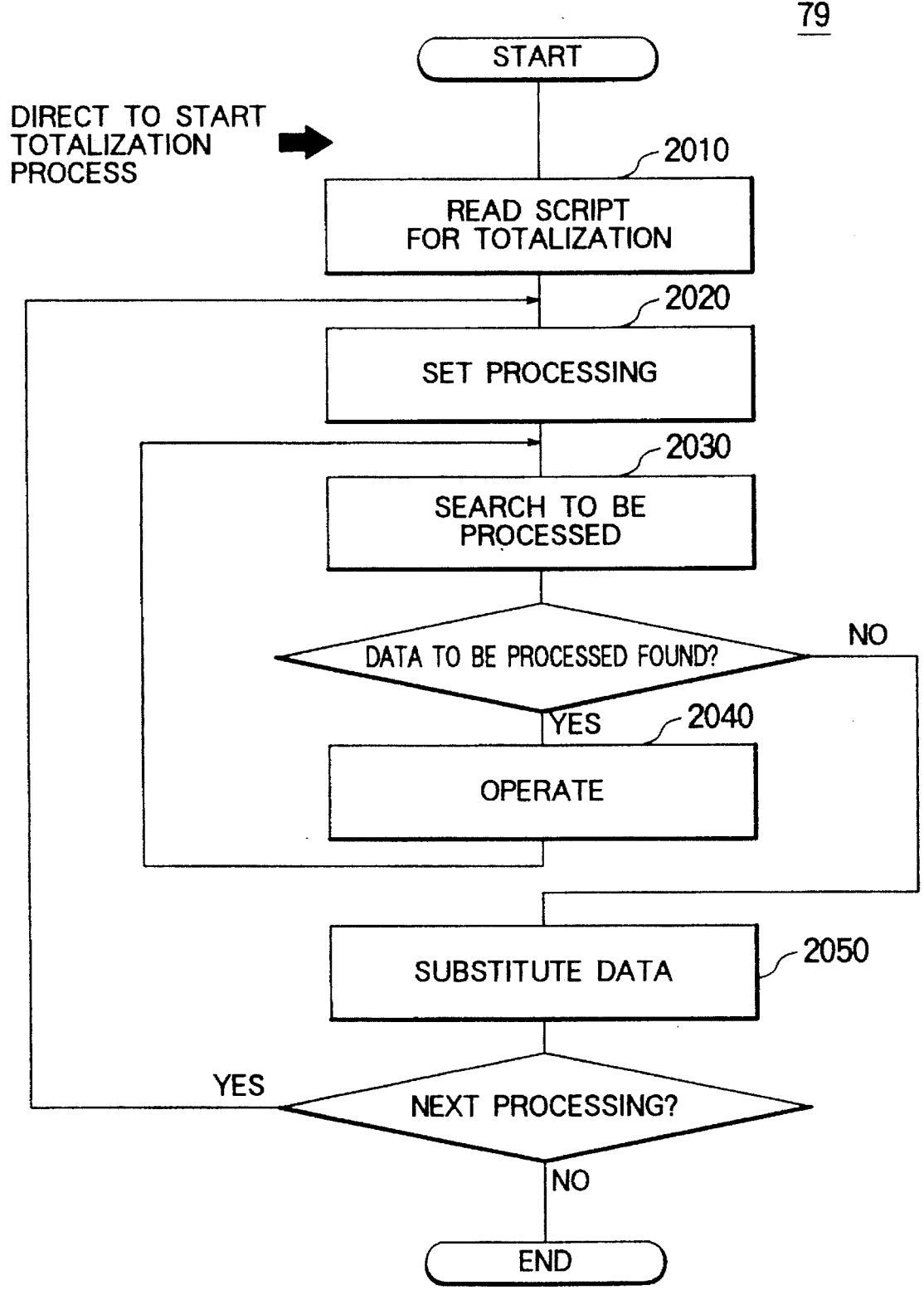

First, in a format preparation step 333, format definition information 13*c* for displaying a totalization result in a slip form is prepared. The format definition information includes an item name of data to be totalized stored in the file 13, a condition to be met by the data to be totalized, and a processing formula for totalizing the data, as the process definition 71 of FIG. 5B does. In a search step 334, the file is searched based on the item name and the condition of the format definition information to retrieve desired data 13*d*. The format definition information 13*a* of each slip in the file 13 is searched by the item name and desired data 13*d* is retrieved from the data 13*b* through the definition information 13*a*. The data 13*d* are totalized in accordance with the processing formula of the definition information 13*c* to produce totalization data 13*e* (335). A detail of the totalization step 335 will be explained later by referencing FIGS. 24 and 27. A ledger for the slips stored in the file 13 is prepared by the definition information 13*c* and the totalization data 13*e*, and the definition information 13*c* and the totalization data 13*e* of the ledger is registered in the file 13 as a new file (336). The above process is performed as required so that various totalization data are acquired from the respective slip data. For example, daily slips of one month may be totalized and monthly ledger data of one year may be further totalized by using the above process.

Figure 6:
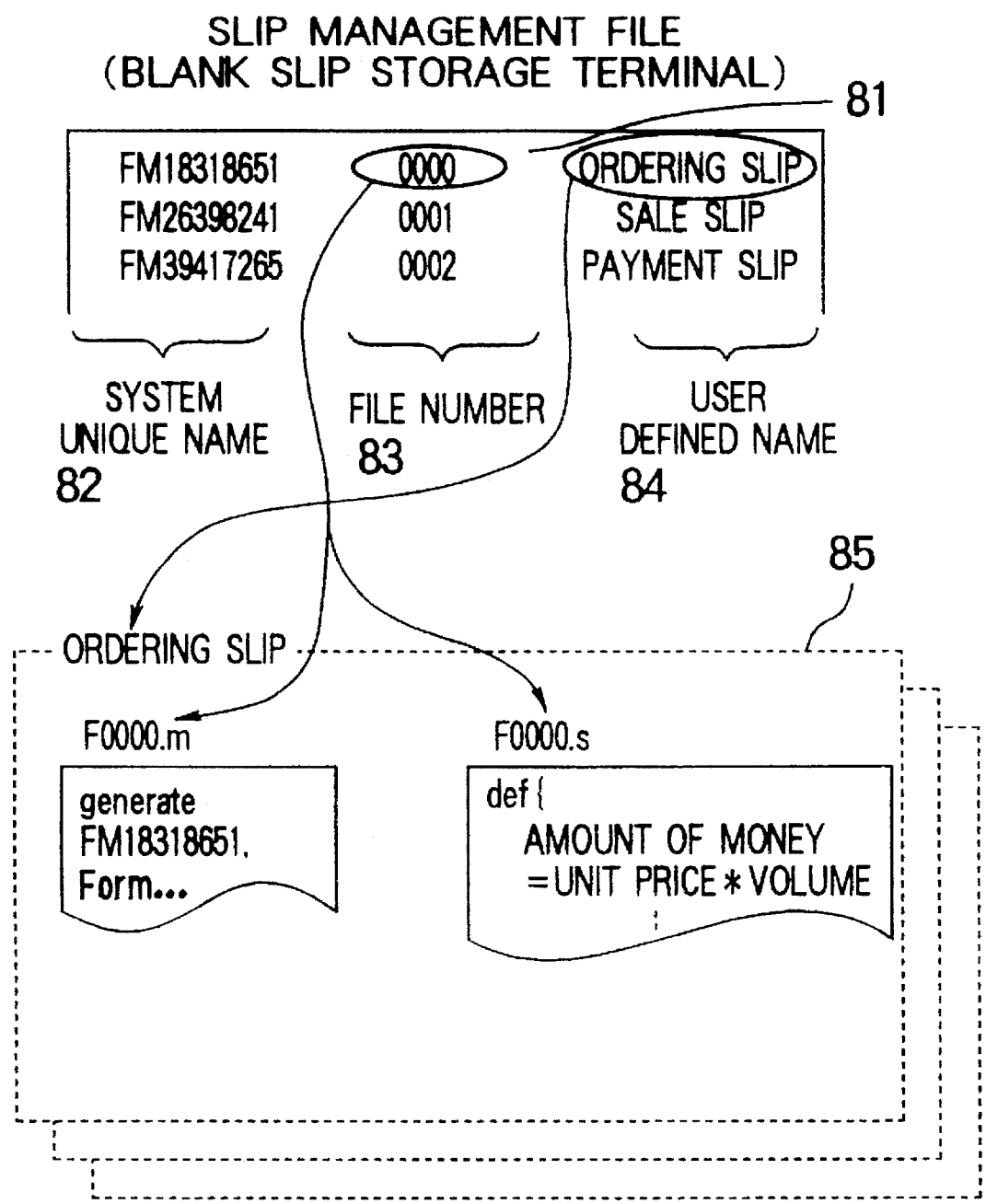

Information necessary to precess the slips is now explained. In the present system, slips of a plurality of types are processed. In each work station, the slip is managed by a slip management file 81 shown in FIG. 6. FIG. 6 shows a slip management file in a blank slip storage terminal. Each slip includes a system unique name 82 which is unique in the system, a file number 83 for specifying a file name in which the information of the slip is stored, and a user defined name 84 which is the name of slip defined by a user, and a correspondence relation thereof is managed by the slip management file 81. For example, when the user specifies an ordering slip as the user defined name, the system refers to the slip management file 81 to search the file number corresponding to the ordering slip to retrieve the file number "0000" 83.

Figure 7:
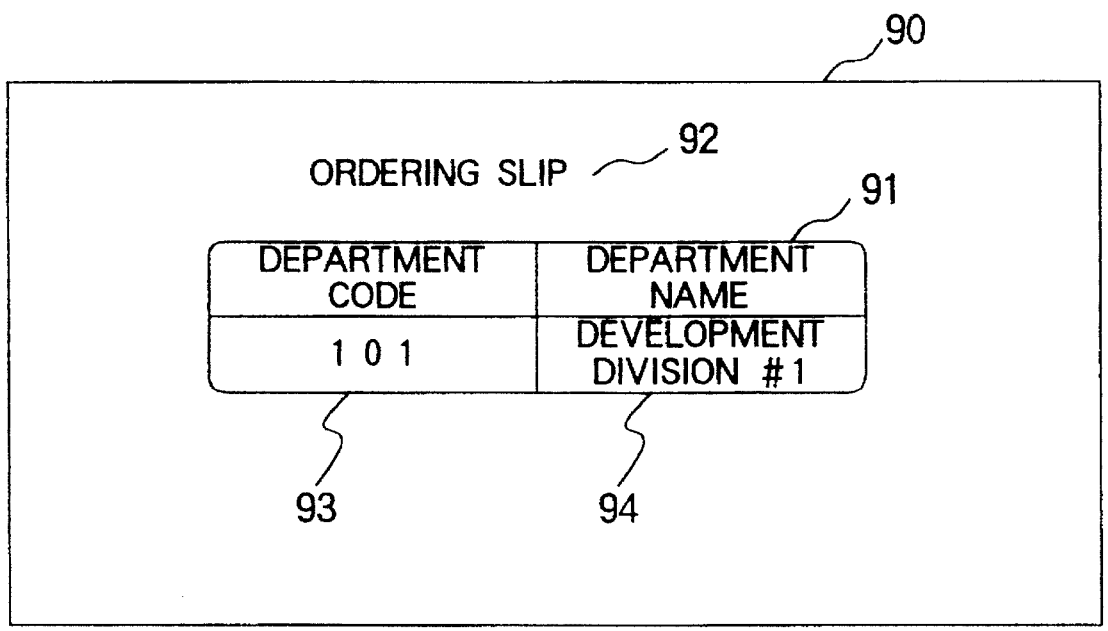

A file F0000.m which stores the format definition information and the data and a file F0000.s which stores the processed information shown in FIG. 4 are read from a file designated by the file number 83. The file F0000.s stores the processing formula 63 explained in FIG. 4. In order to explain the content of the file F0000.m, a portion of the ordering slip 1 shown in FIG. 1 is shown in FIG. 7. A slip 90 comprises a table 91 and a character string 92, and the table 91 comprises a department code 93 and a department name 94. Data "101" is set in the department code 93, and "DEVELOPMENT DIVISION #1" is set in the department name 94.

A content of the file F0000.m for displaying FIG. 7 is shown in FIGS. 8 and 9. In the file F0000.m, information of the slip information, the table list, the item list and the character area list and related information are stored as text data. Line number 1 describes the description on the slip information, line numbers 2 and 3 describes the table list information, line numbers 4 and 5 describe table head item information for a table, line numbers 6 and 7 describe table side item information, and line numbers 8 and 9 describe information on one table head item (department code and department name are shown in FIG. 7). Line number 10 describes the information on one table head item. Of the items of the table, the items arranged horizontally in the table describe table head items, and the items arranged vertically in the table describe table side items. Line number 11 describes the description on a relation between the table head information and the table side information of the table body information, line number 12 describes the information on the data "101", line numbers 13 and 14 describe the information on the data "DEVELOPMENT DIVISION #1", and line number 15 describes the information necessary to display the character area "Ordering slip"92. Line number 16 describes a relation between the table head item information and the slip information, line number 17 describes a relation between the table side item information and the slip information, line number 18 describes a relation between the table body and the slip information, and line number 19 describes a relation between the data and the item name. In this manner, since the text data contents are stored in the file F0000.m which contains the format definition information and the data, even if the content is transmitted to a computer of a different type in the communication through the network, the content received can be edited on the receiving computer.

Figure 10:
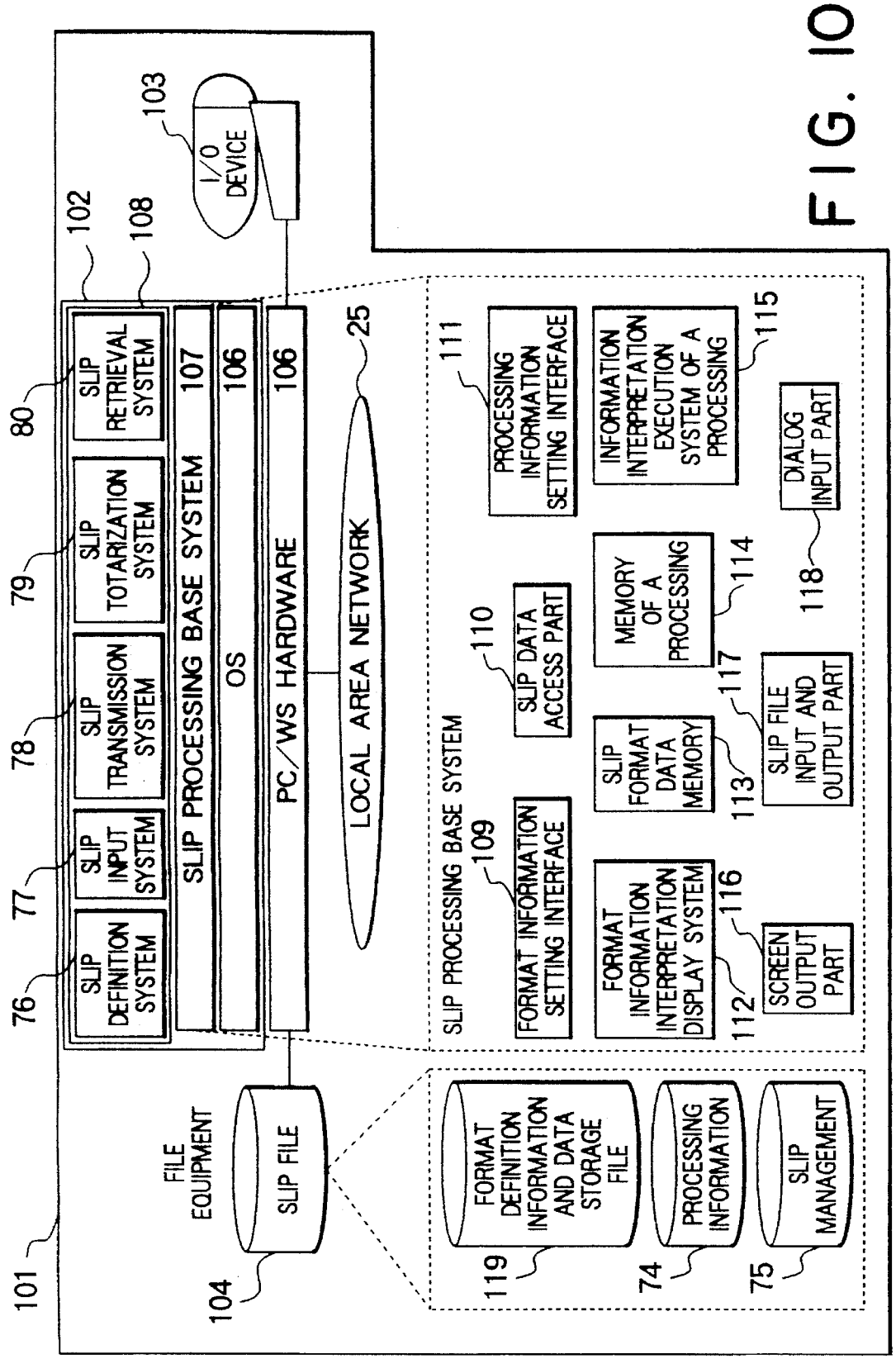

A system configuration of the present invention is shown in FIG. 10. A hardware configuration of a system 101 comprises a CPU 102, I/O device 103 including an output device such as a CRT display and an input device such as a keyboard or a mouse, a file equipment 104 and a LAN 25. A software configuration comprises an OS 106, a slip processing base system 107 which is a core of the present invention, and application programs 108 operated by the slip processing base system. The slip processing base system 107 comprises an format information setting interface 109, a slip data access part 110, a processing formula setting interface 111, a format information interpretation display system 112, a slip format data memory 113, memory of a processing 114, an information interpretation execution system of a processing 115, a screen output part 116, a slip file input and output part 117 and a dialog input part 118. The screen output unit 116 and the dialog input part 118 interactively process in the input/output devices through the OS 106.

The file equipment 104 stores a slip file which comprises a format definition information and data storage file 119, a process information file 74 and a slip management file 75, the data necessary for the slip processing is read and written through the slip file input and output part 117. The format information interpretation display system 112 has a function of interpreting the content of the format definition information and data storage file 119 developed in the slip format data memory 113 and displaying it, and a function of interpreting the content of the processing information file 74 developed in the memory of a processing 114 and executing it. The result of execution is written into the format definition information and data storage file through the slip data access part 110. The format information setting interface 109 and the processing formula setting interface 111 perform the interactive processing such as displaying the slip format and the process definition. The application programs 108 comprise a slip definition system 76, a slip input system 77, a slip transmission system 78, a slip totalization system 79 and a slip retrieval system 80.

Figure 11:
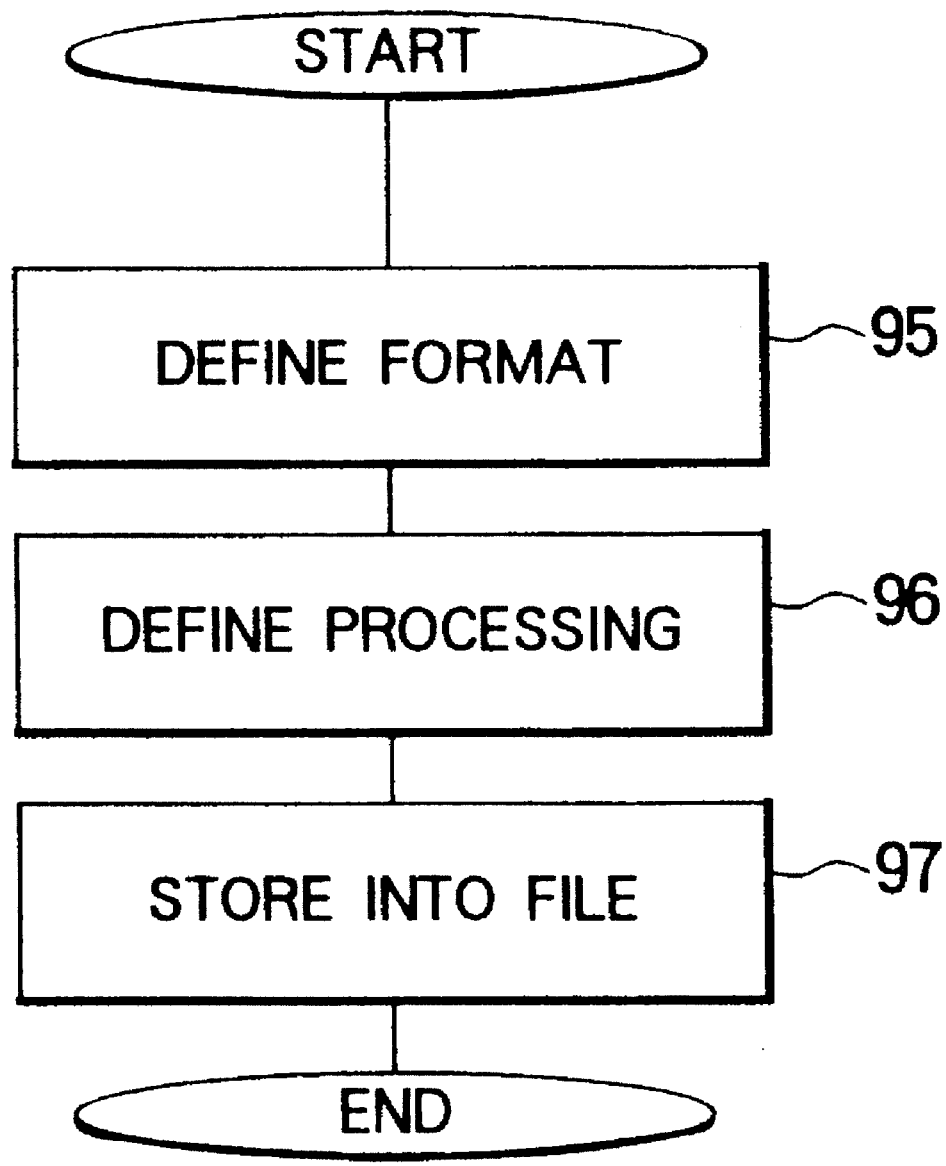

The slip definition system 76 defines the slip format and the processing information. FIG. 11 shows a flow chart of a process flow.

Step 95: The format information setting interface 109 is started and the format is defined in accordance with a screen 64 shown in FIG. 12. A position and a size of the table are designated by the mouse, and the number of cells is designated as a parameter.

Figure 13:
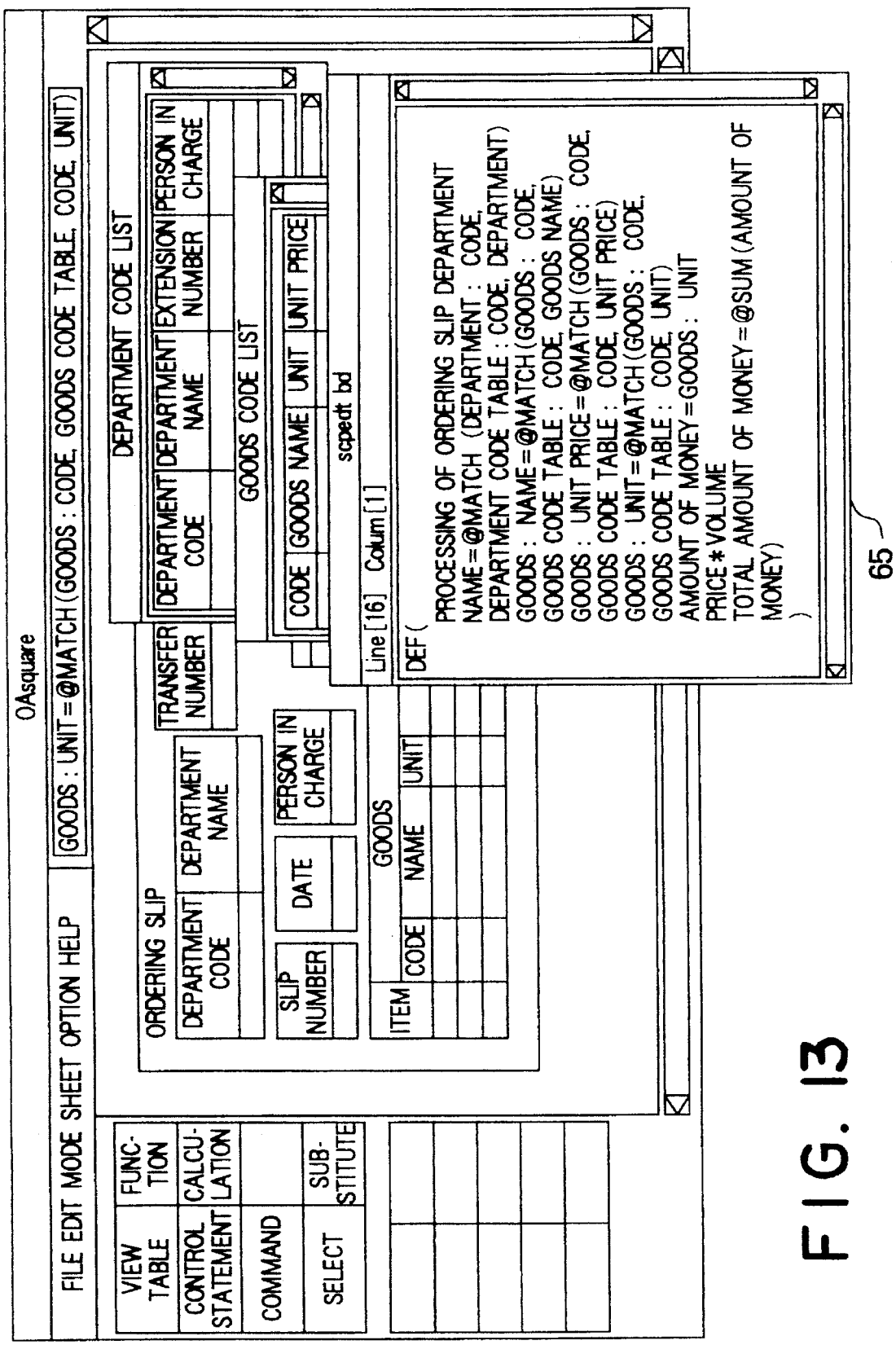

Step 96: The processing information setting interface 111 is started and the processing information is designated through a screen 65 of FIG. 13. The processing information is designated by each item name.

Step 97: The defined data are stored in the respective files. The format is stored in the format definition data storage file 119, and the processing information is stored in the processing information file 74.

Figure 14:
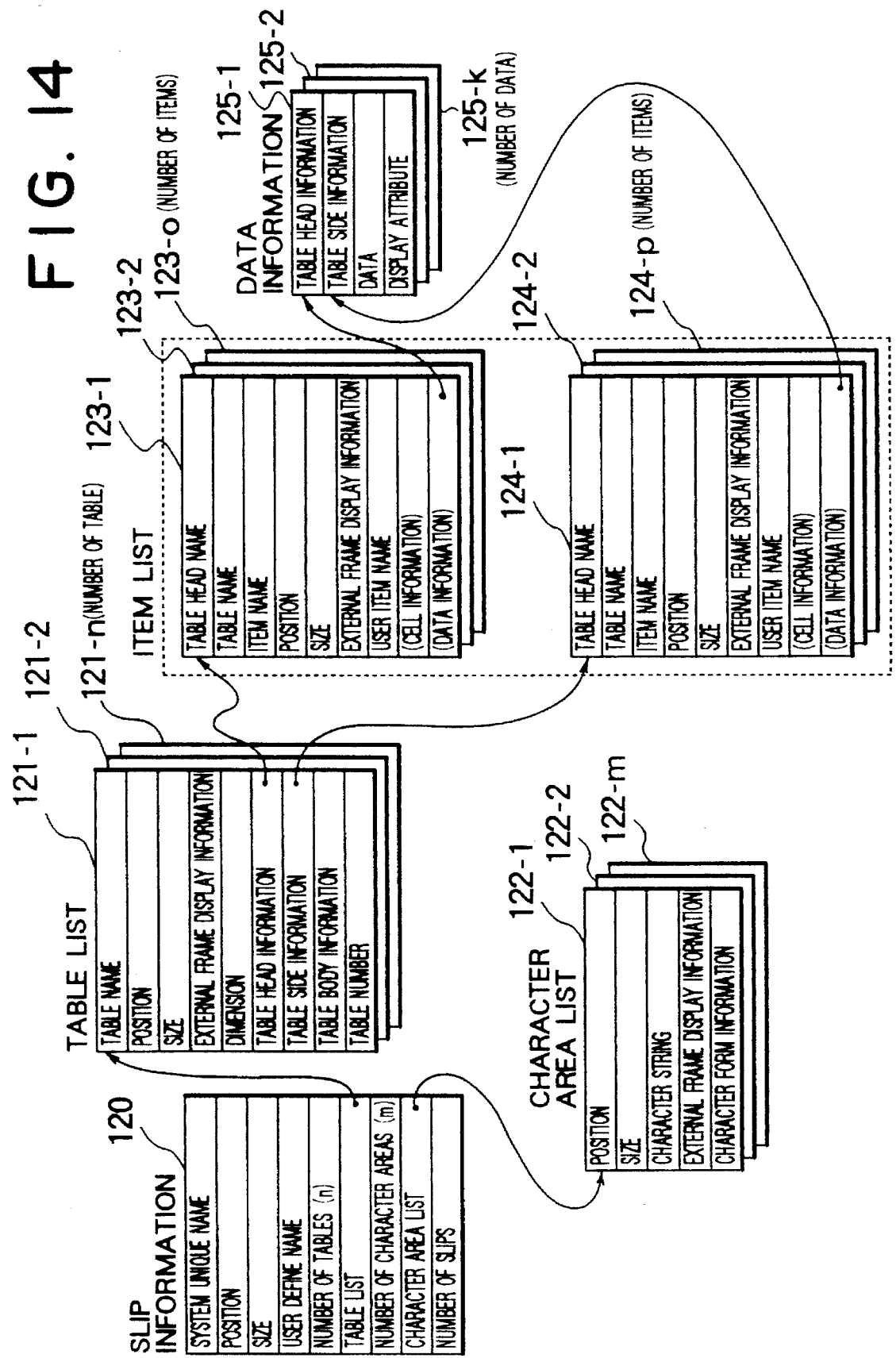
Figure 15:
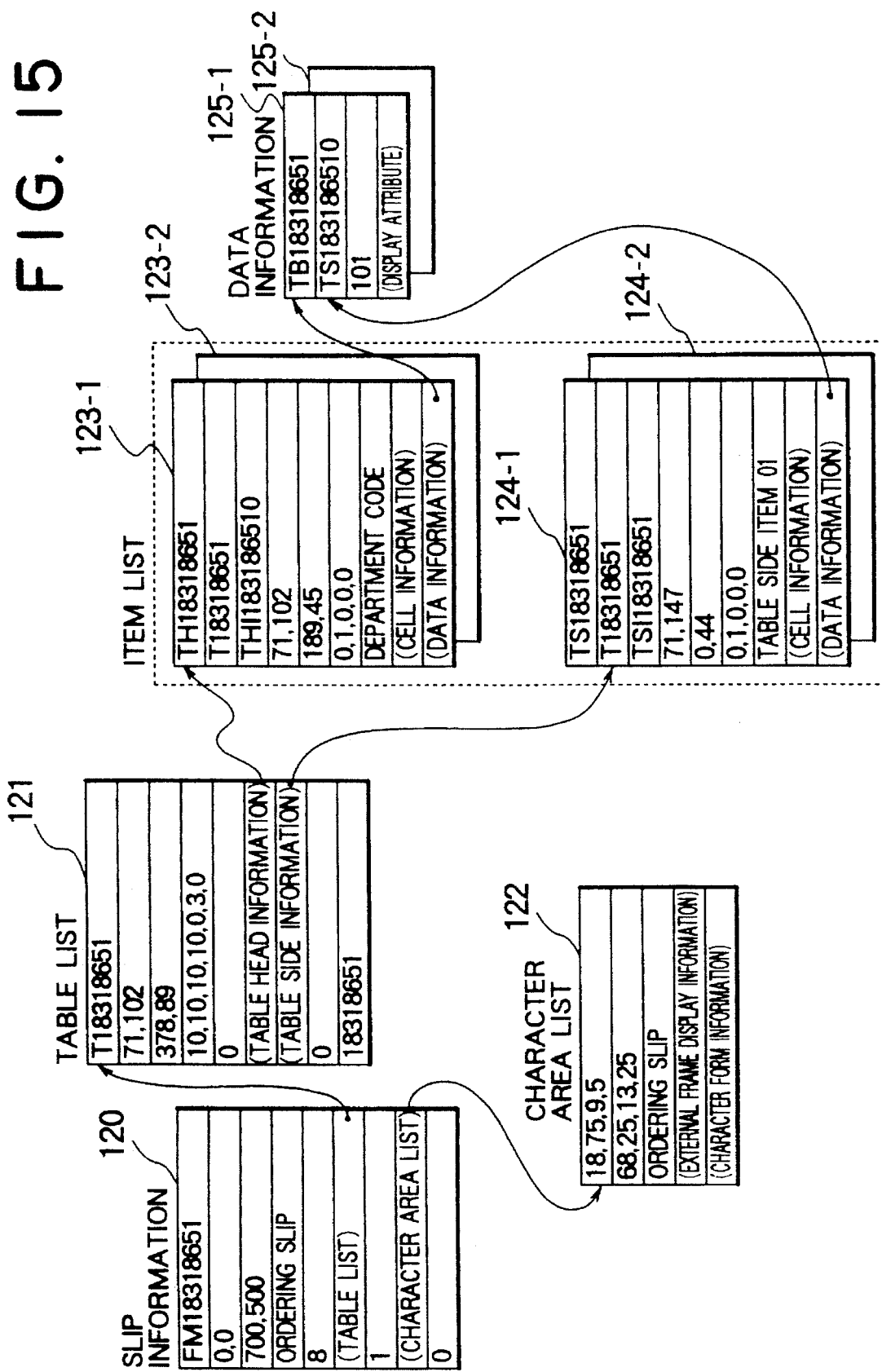
Figure 17:
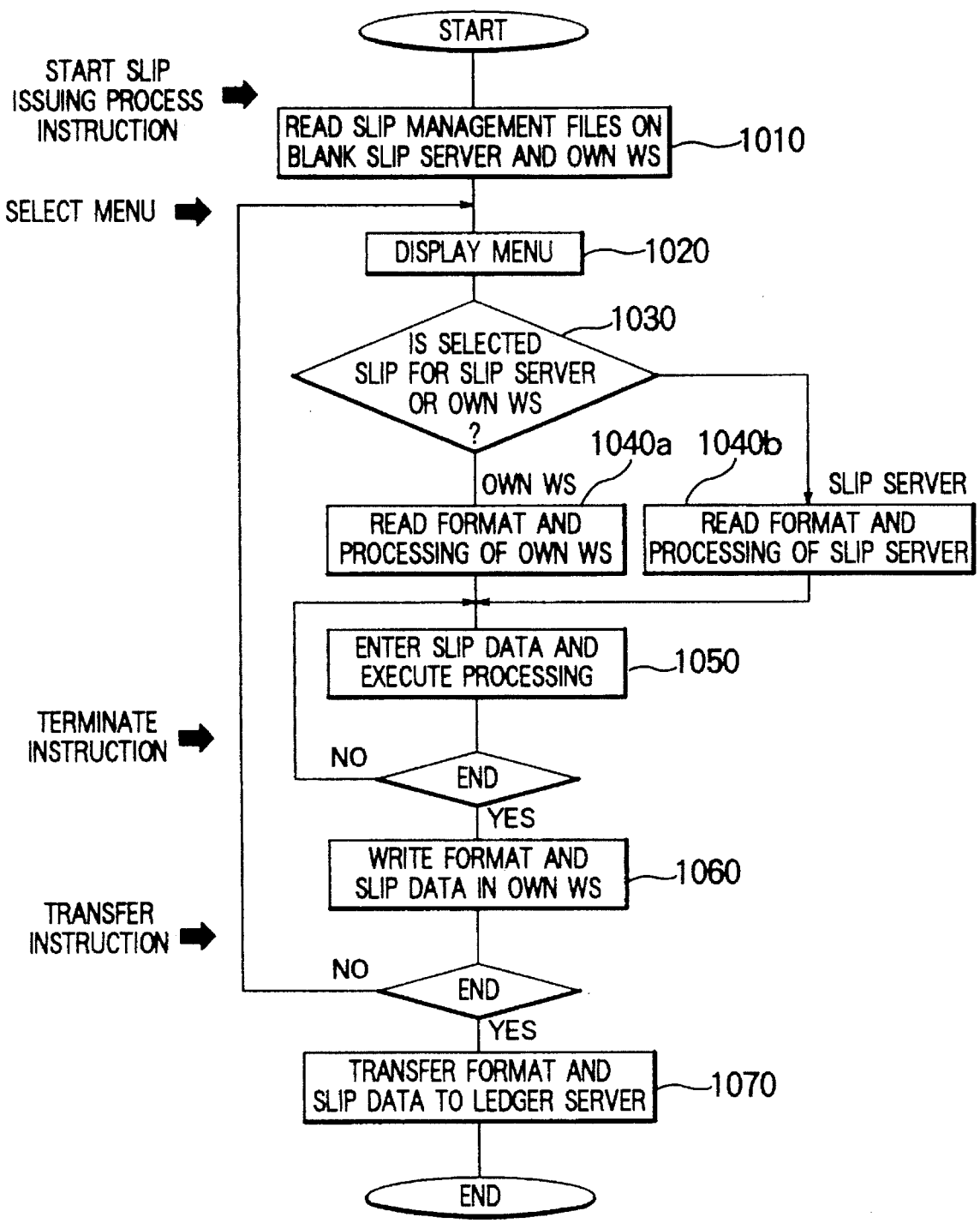

FIG. 14 shows a map of the table when the content of the file F0000.m which stores the format definition information and the data is developed in the slip format data memory 113. As the slip information 120, a system unique name, position information for display, a size of the slip, a user defined name, the number of tables, pointer information to the table list which store the content of the tables, the number of character areas, pointer information to the character area list which stores the content of the character areas, and the number of slips are held. The table lists 121-1 to 121-n are provided as much as the number of tables, and it holds information on the table name, the position information of the table, the size of the table, external frame display information, the number of dimensions, the table head information, the table side information, the table body information and the table number. Each of the character area lists 122-1 to 122-m holds the information on the character string such as the ordering slip and the transfer slip. The lists are provided as many as the number of character areas, and each list holds the position information of the character area, the size of the character area, the information on the character string, the external frame display information and the character type information. The table head information of the table list stores a pointer to the table head item list, and the item list includes lists 123-1 to 123-o which are managed for each table head and lists 124-1 to 124-p which are managed for each table side. Each of the lists 123-1 to 123-o holds the table head name, the table name, the item name, the item position information, the size, the external frame information, the user item name, the cell information and the pointer information to the area in which the data is actually held. Each of the lists 124-1 to 124-p holds the table side name, the table name, the item name, the item position name, the size, the external frame information, the user item name, the cell information and the pointer information to the area in which the data is actually held. Each of the data information 125-1 to 125-k holds at least one of the table head information and the table side information. FIG. 15 shows a status in which the information of the text data as shown in FIGS. 8 and 9 is developed in a memory map as shown in FIG. 14. The slip information 120 manages the information for displaying the slip 90 of FIG. 7, the character area list 122 manages the information representing the character string such as the ordering slip 92, the item lists 123-1 and 124-1 manages the information on the department code 93, and the data information 125-1 manages the data (for example, "101") of the department code 93. FIG. 9 shows an initial state of the work station. The terminals 21 and 31 to 33 store slip management files 146 to 149, respectively, and the blank slip storage terminal 21 stores the formats of an ordering slip 150, a sales slip 151 and a payment slip 152 and the processing information. The totalization terminal 33 stores a format of an ordering slip binder 153 and the processing information. Referring to the system configuration of FIG. 10 and the flow chart of FIG. 17, a process of issuing the ordering slip 150 at the slip entry terminal-A 31 which is the function of the slip entry unit 77 is described.

Figure 18:
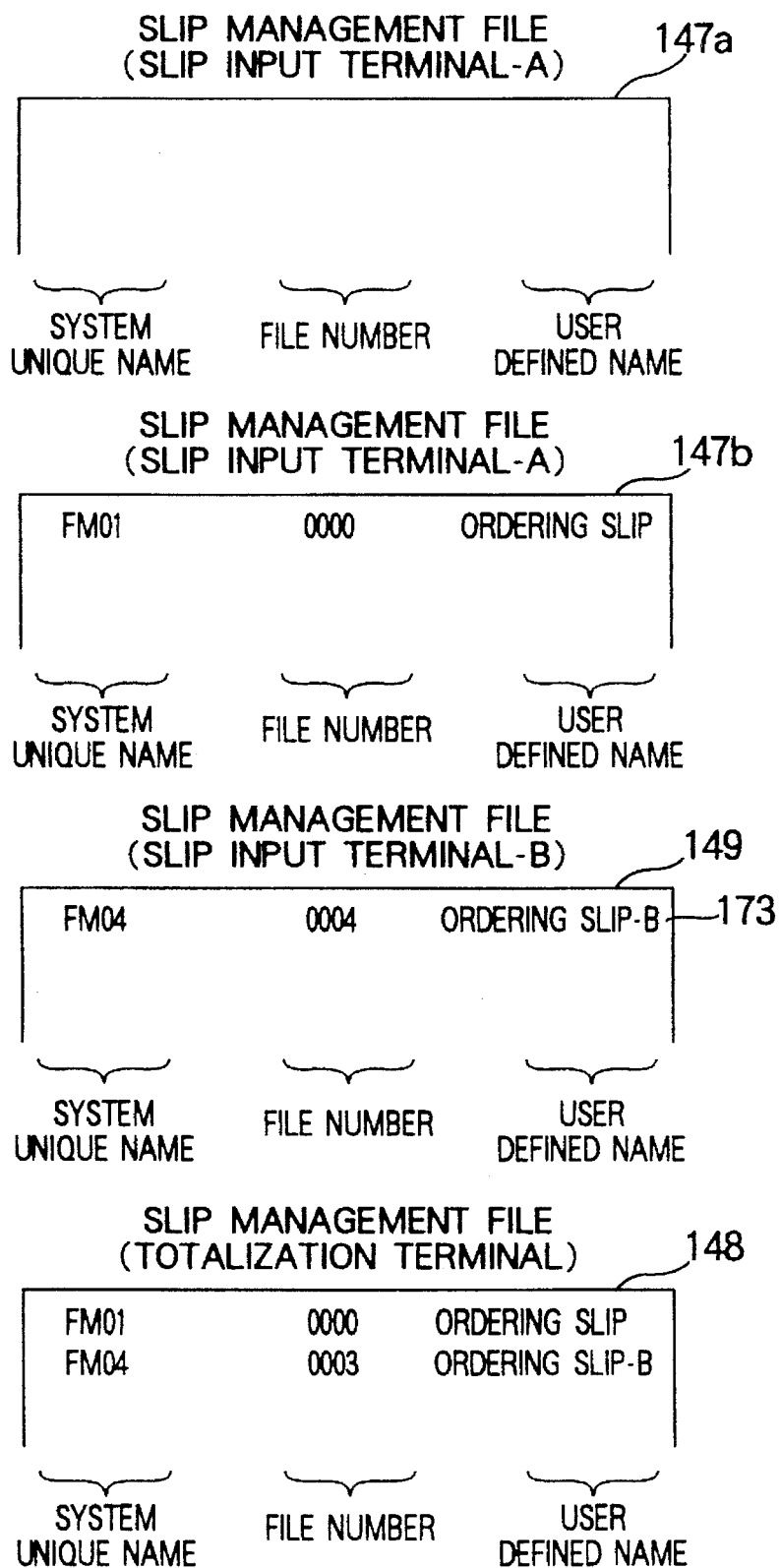

Step 1010: When the slip issuer-A 35 commands the start of the slip issuance process, the slip entry unit 77 is started and the slip management file 146 of the blank slip storage terminal 21 and the slip management file 147 (75 in FIG. 10) of the slip entry terminal-A 31 are referenced through the LAN 25. An initial state of the slip management file 147 of the slip entry terminal-A 31 is shown in an example 147a in FIG. 18. The slip management file 146 of the blank slip entry terminal is identical to that shown in FIG. 6.

Step 1020: The user defined names of the slip management files 146 and 147 of the blank slip entry terminal 21 and the slip entry terminal-A 31 are displayed as a menu of processable slip names. The user selects the name of the slip to be processed from the displayed slip names. In the present embodiment, the ordering slip 150 is selected.

Step 1030: The name of the selected slip is retrieved from the slip management files 146 and 147 of the blank slip storage terminal 121 and the slip entry terminal-A 31, and whether the selected slip belongs to its own work station or other work station (slip server) is determined.

Steps 1040a, 1040b: The corresponding format (119 in FIG. 10) is read from the blank slip storage terminal 21 or the slip issue terminal-A 31 by the slip data accessing unit 110 and the processing information 110 is read by the processing formula information interpretation execution unit 115. In the present embodiment, since the blank slip storage terminal 21 manages the format of the ordering slip and the processing information, they are read and developed on the memory of the slip entry terminal-A 31 (FIG. 15) and they are displayed on the screen.

Step 1050: An operator interactively operates while he/she watches the screen to enter the slip data. The entered data is referenced and whether an arithmetic operation is included or not is determined by the processing formula information interpretation execution unit 115. If it is, the processing formula is executed in this step.

Figure 19:
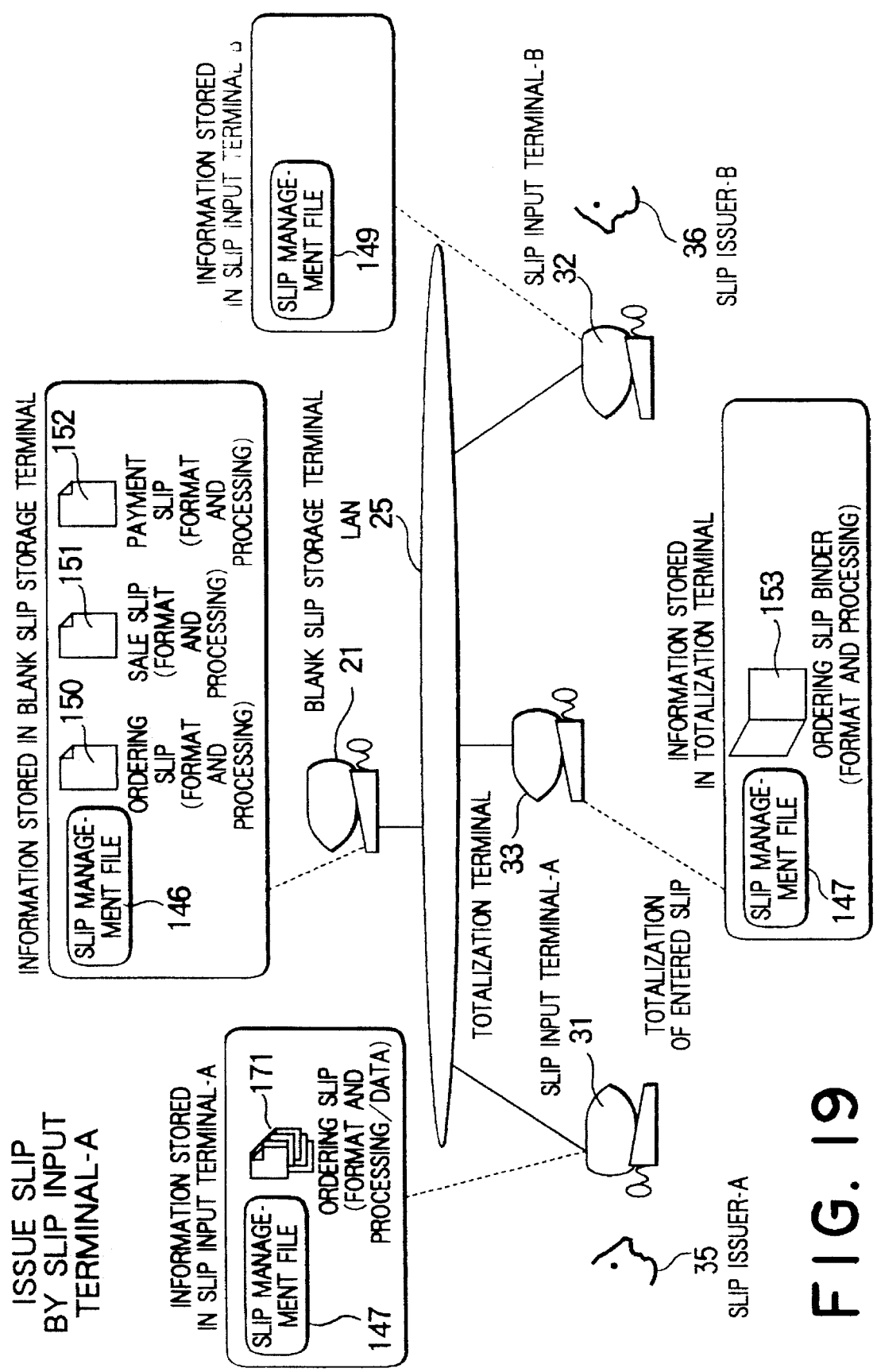

Step 1060: After the end of entry of the slip is indicated, the format and data of the entered slip are stored in the format and data file 109 of the slip input terminal-A 31 through the slip data accessing unit 110. As a result, as shown in FIG. 19, the format and data of the ordering slip 117 are added on the slip input terminal-A. The slip management file of the slip input terminal-A 143 is shown in an example 149b of FIG. 18.

Figure 20:
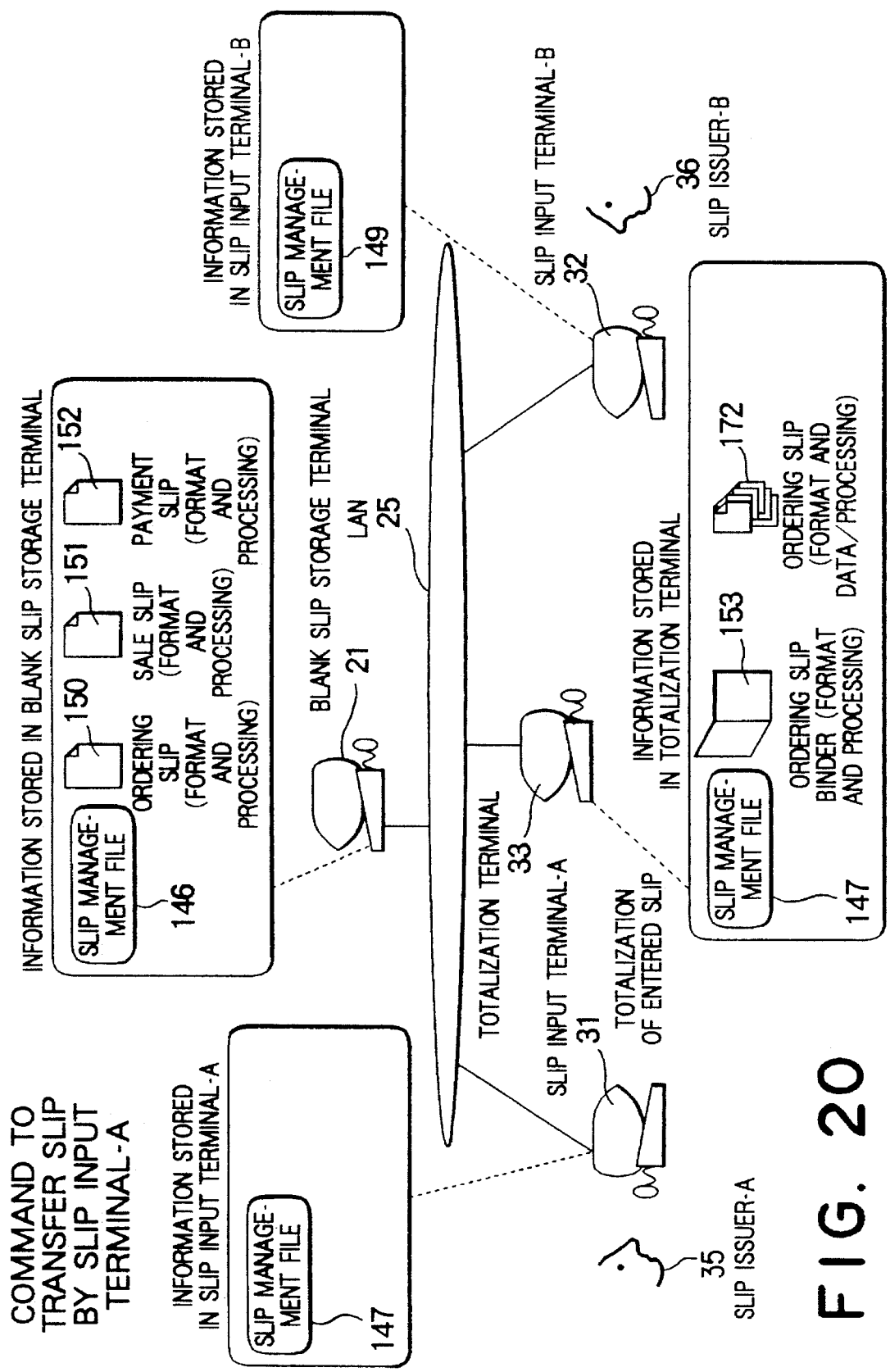
Figure 21:
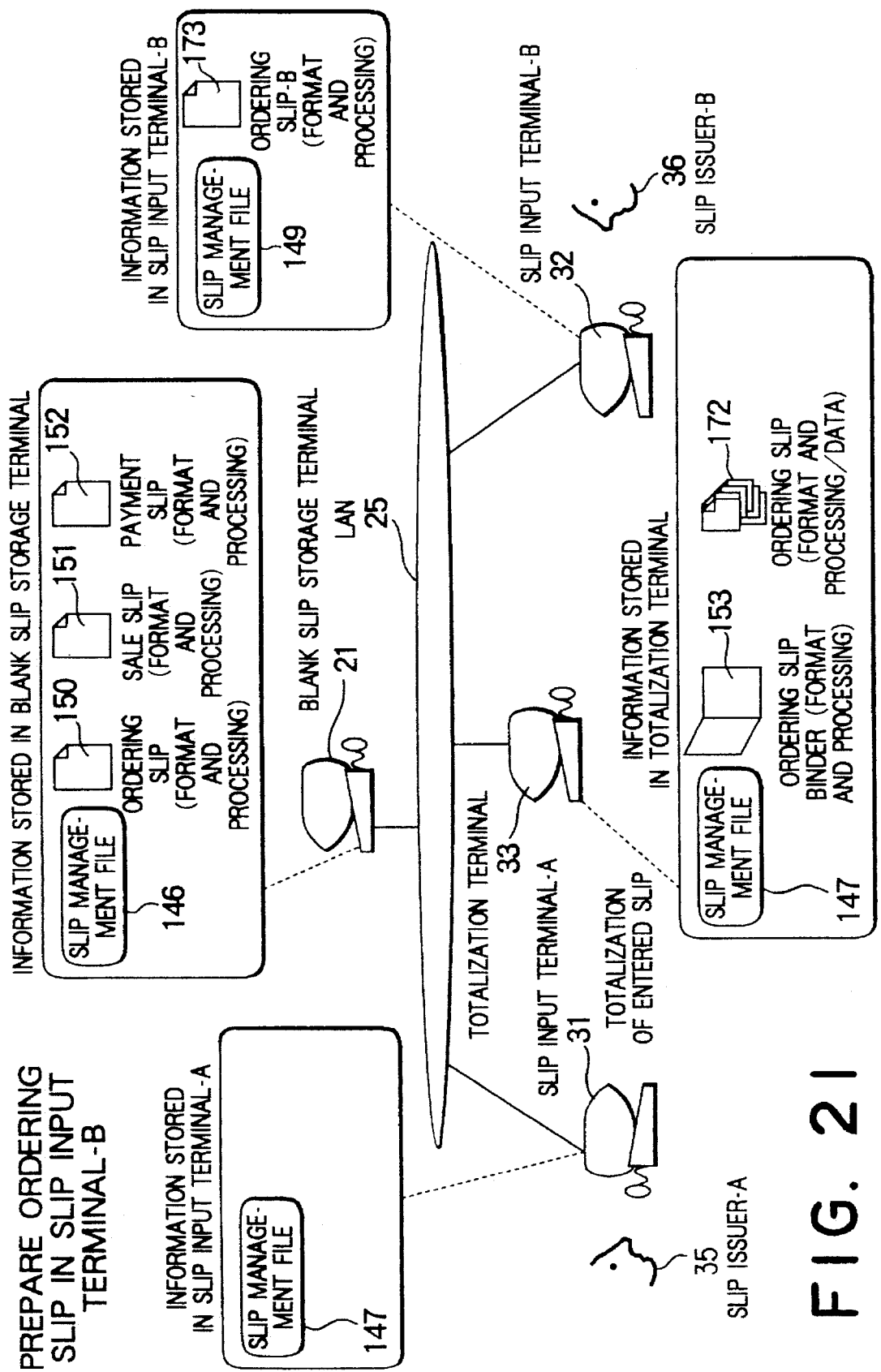
Figure 22:
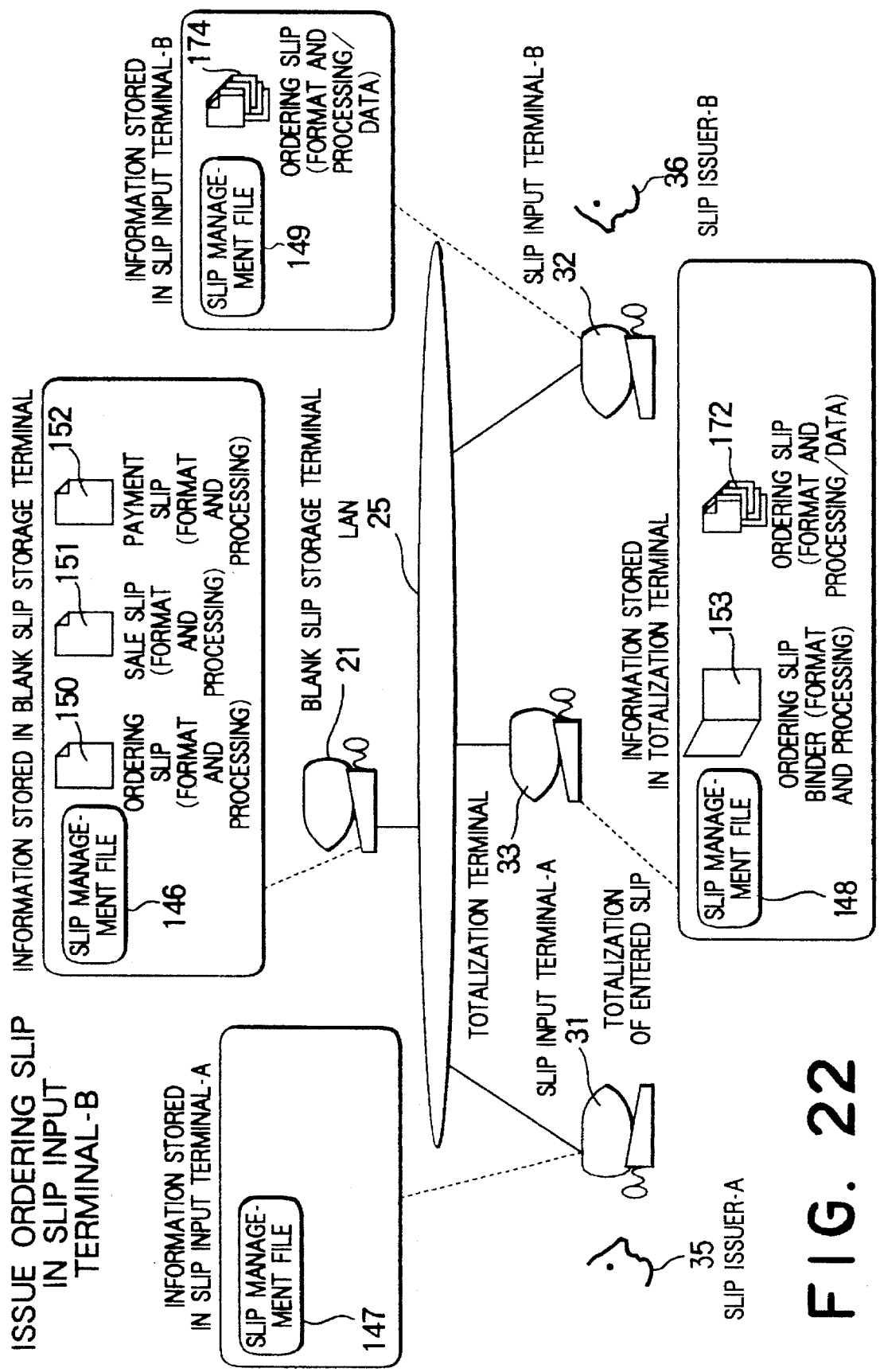

Step 1070: When the operator commands the transfer of the slip to the totalization terminal 33, the slip transmission system 78 is started and the format and data are transferred to the totalization terminal 33. An ordering slip 172 of FIG. 20 indicates that the ordering slip 171 of the slip entry terminal-A 31 has been transferred to the totalization terminal 33.

Figure 16:
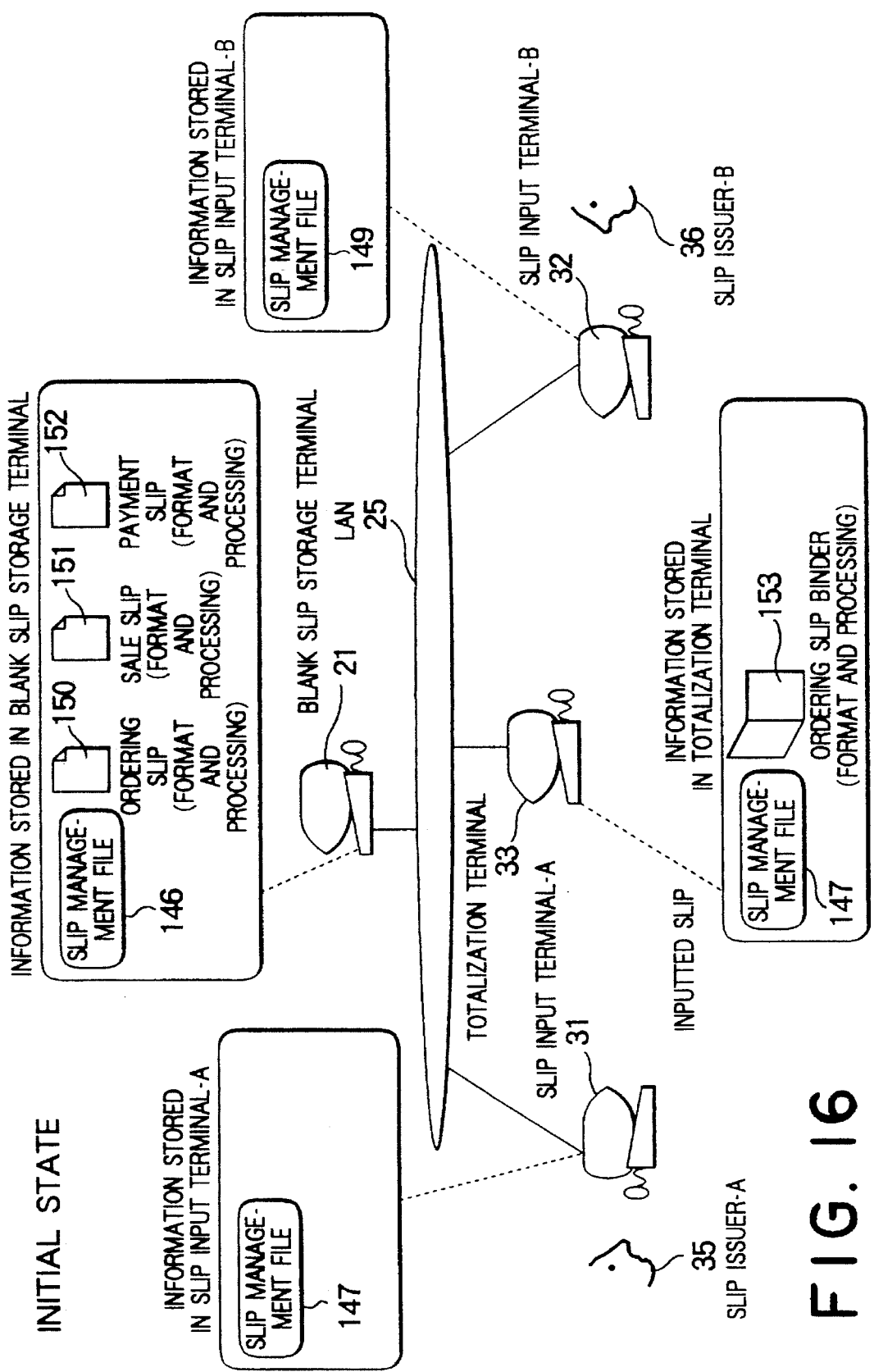

In the slip entry terminal-B 32 of FIG. 16, a portion of the ordering slip 150 from the blank slip storage terminal 21 is modified to prepare a new ordering slip-B (FIG. 3). The ordering slip-B (173 in FIG. 18) is registered as a user defined name in the slip management file 149 of the slip entry terminal-B 32, and the format and the processing information are managed by the slip entry terminal-B 32. When the slip issuer-B 155 commands the start of the slip issue process, the slip management files 146 and 149 of the blank slip storage terminal 21 and the slip entry terminal-B 32 are referenced. When the operator selects the ordering slip-B 173, the format of the slip and the processing information are read from the slip issue terminal-B 32 so that the interactive operation is ready. After the entry of the slip data, the format and the data are transferred to the totalization terminal 33 by the command to transfer to the slip totalization terminal (175 in FIG. 23). The slip management file of the slip input terminal-B 32 is shown in an example 149 in FIG. 18.

The function of the slip totalization system 79 is now explained. The process in the totalization terminal 33 is explained with reference to a flow chart of FIG. 24. The slip management file 148 of the totalization terminal 33 is shown in an example 148 of FIG. 18.

A person in charge of totalization of the slips may confirm the status of the slip data transfer by a screen 180 shown in FIG. 25. When the totalization of the slips is commanded, the transferee slips and binder are displayed by icons on the screen as shown in FIG. 25, and the operator drugs the slip and drops it on the binder to start the totalization of the slip. Then, the following process is performed.

Step 2010: The totalization processing information is read by the processing formula information interpretation execution unit 115 as shown by the processing 71 of FIG. 5.

Step 2020: The operation formula for the process is set by the processing formula information interpretation execution unit 115.

Step 2030: The data to be processed is read from the format definition information and data storage file of each slip by the slip data access part 110. Based on the item list of each slip, the presence or absence of the item designated by the processing formula is checked, and if there is a corresponding item, the necessary data is read based on the data information.

Step 2040: When there is data to be processed, the data is processed by the information interpretation execution system of a processing 115.

Figure 26:
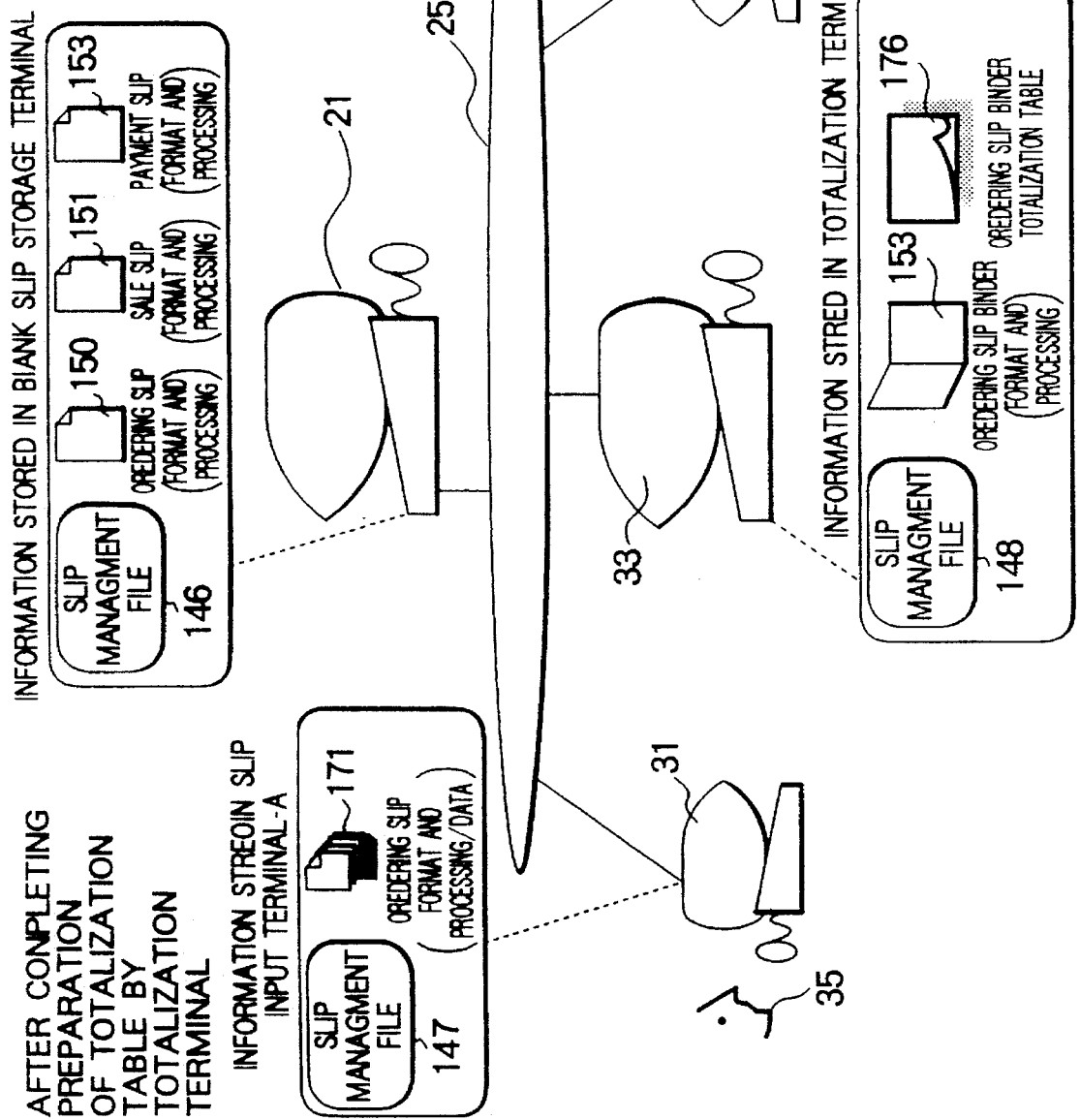

Step 2050: A result of operation is placed in a predetermined item. If there is a processing formula to be executed next, the process returns to the step 2020, and if there is not, the process is terminated. When the totalization process is terminated, a totalization table 176 as shown in FIG. 26 is generated in the totalization terminal 33.

Figure 27:
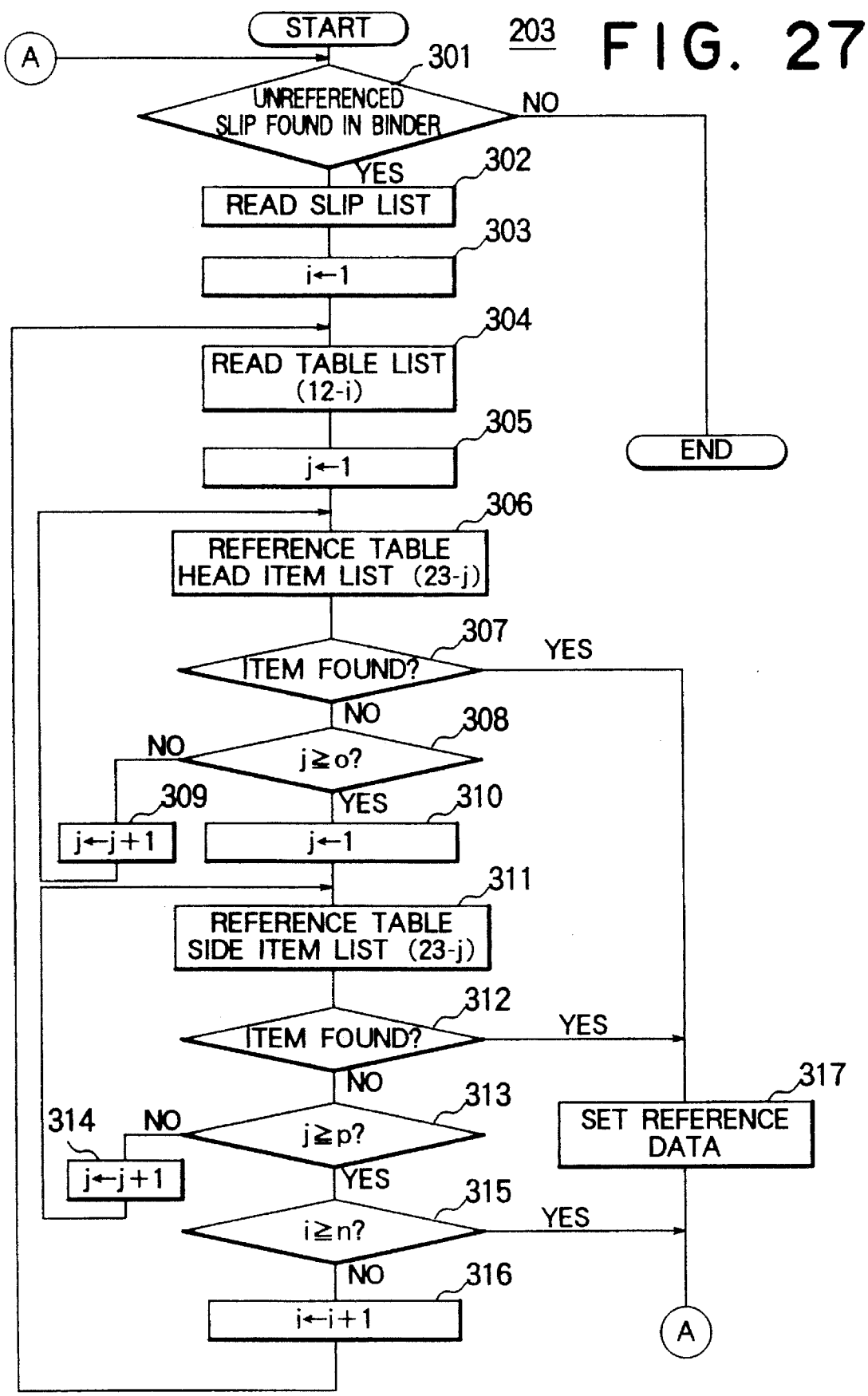

FIG. 27 shows a further detail of the process in the step 203, that is, the process by the slip data access part 110.

Figure 28:
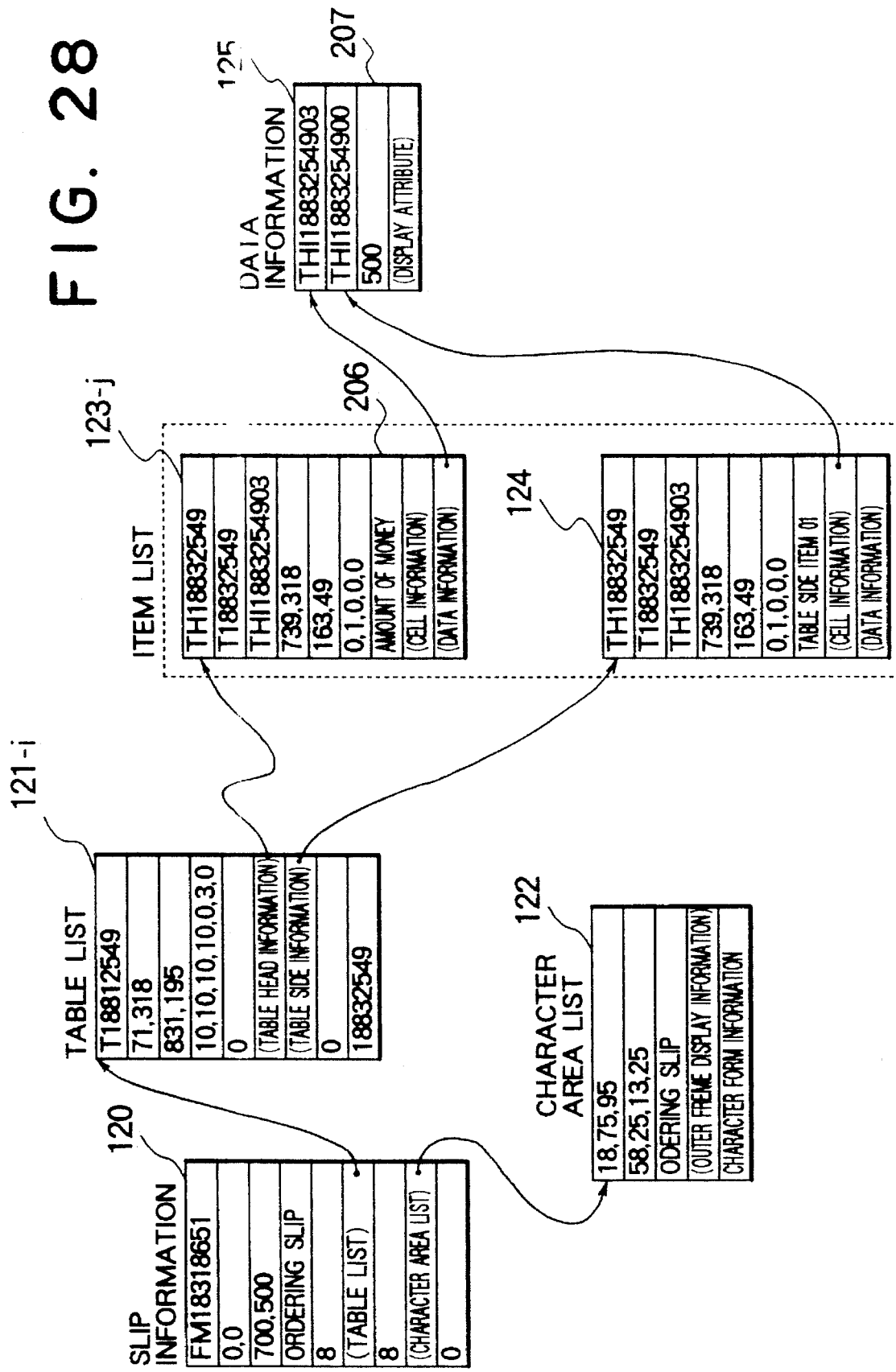
Figure 29:
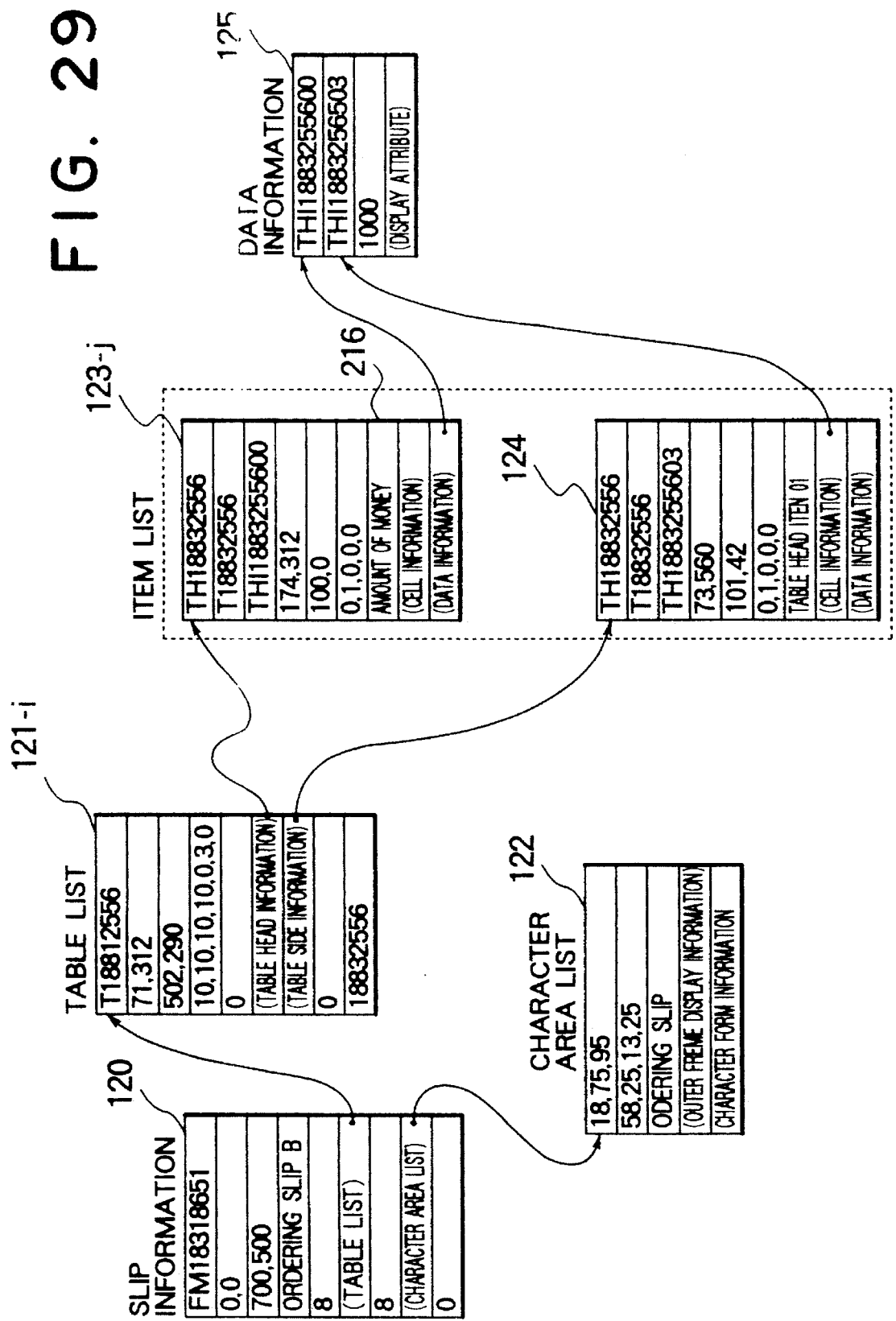

The process of referencing the amount of money from the slip when the totalization formula 2.6 of FIG. 5;

Amount of money=@sum (*:amount of money) is calculated is explained based on the data of the slip used in the slip processing terminal-A and the slip entry terminal-B. FIG. 28 shows the format definition and the data file of the ordering slip (172 in FIG. 20), and FIG. 29 shows those of the ordering slip-B (175 in FIG. 23), developed on the memory.

Figure 23:
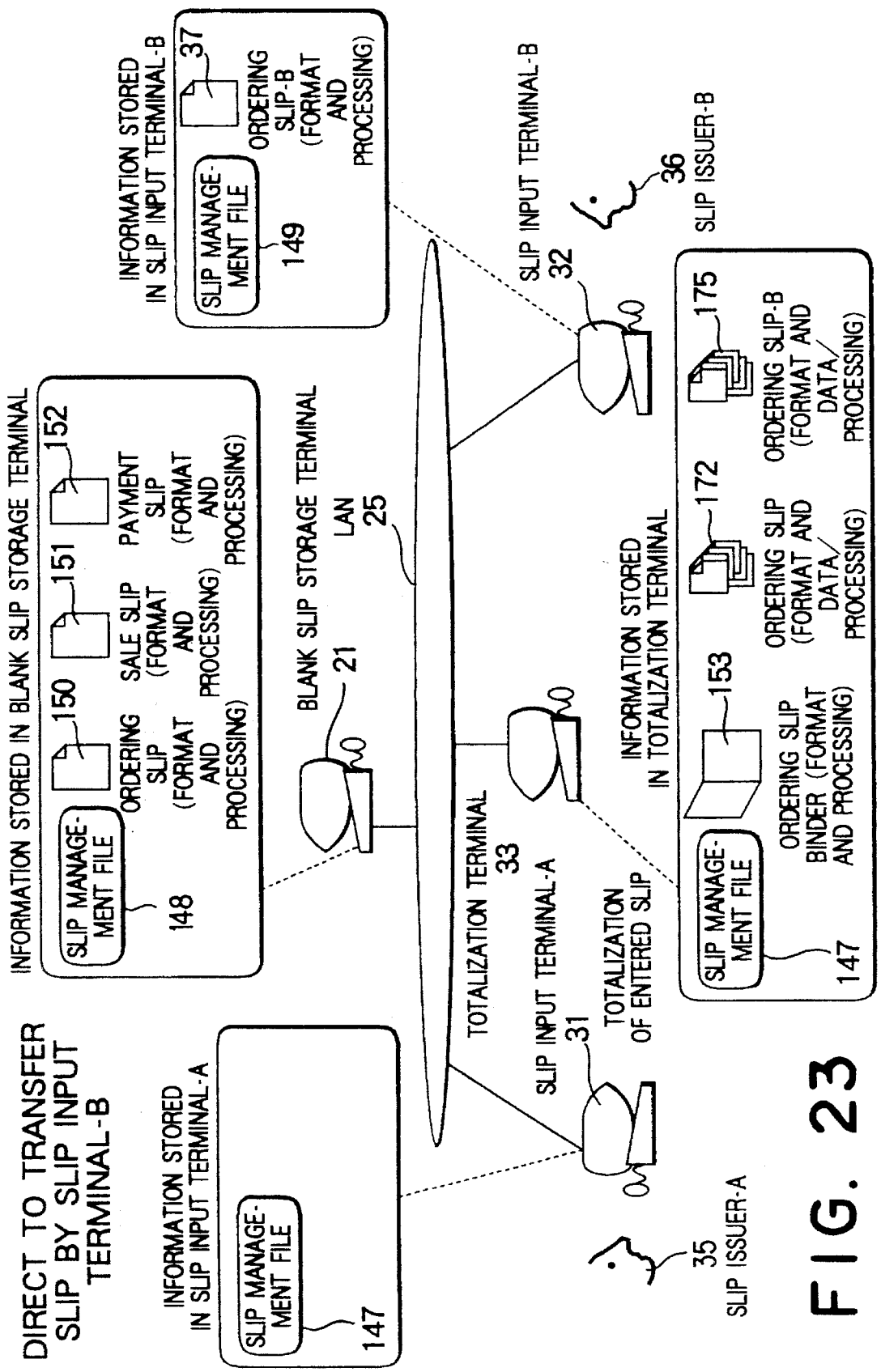

Step 301: Whether there is an unreferenced slip in the binder or not is determined. In FIG. 23, there are two, the ordering slip 172 and the ordering slip-B 175. The explanation is made based on the memory of the ordering slip of FIG. 28.

Step 302: The slip list of the slip to be referenced is referenced. In FIG. 28, slip information 200 is referenced.

Step 303: "1" is set in a counter of the table list. A variable which stores the count of the table counter is hereinafter designated as i.

Step 304: The table list 121-i is read.

Step 305: "1" is set in a counter of the item list. Hereinafter, a variable which stores the count of the item list counter is designated as j.

Step 306: The table head item list 123-j is referenced.

Step 307: Whether the item name 206 matches to the item name under search is determined. In the present embodiment, "Amount of money" is searched. If the item name matches, the data is set based on the data information in a step 317 and the process returns to the step 301. In this step, the data of the ordering slip is acquired.

Step 308: If there is no matching item name in the step 307, whether there is unreferenced table head item list or not is determined.

Step 309: If unreferenced table head item list is detected in the step 308, the item counter is incremented by one and the process returns to the step 306.

Step 310: If there is no unreferenced table head item list in the step 308, "1" is set in the item counter.

Step 311: If the desired item is not detected from the table head item list, the table side item list is referenced.

Step 312: Whether the item name matches to the item name under search or not is determined. In the present embodiment, "Amount of money" is searched. If the item name matches, the data is set based on the data information in a step 317 and the process returns to the step 301. In this step, the data of the ordering slip-B is acquired.

Step 313: If there is no matching item name in the step 312, whether there is unreferenced table head item list or not is determined.

Step 314: If there is unreferenced table head item list in the step 313, the item counter is incremented by one (j←j+1) and the process returns to the step 311.

Step 315: If there is no unreferenced table head item list in the step 314, the presence or absence of unread table list is determined. If there is no unread table list, the process returns to the step 301.

Step 316: If there is unread table list in the step 315, the table counter is incremented by one (i←i+1) and the process returns to the step 304.

Step 317: Data is acquired by referencing a pointer of the table information of the table head item list or the table side item list. In FIG. 28, the entry 207 is referenced and the data "500" is acquired.

The above process is performed as required to acquire various totalization data from the data of the respective slips. For example, the above process may be applied when the daily data of one month are totalized and the monthly lodger data of one year are further totalized.

In the above embodiment, the totalization process was explained. In the slip handling job, a particular slip of a plurality of prepared slips may be retrieved. A retrieval method of the slip in the present invention is now explained. Modification 1 (Processing in a slip search unit 80):

Where there are a plurality of types of slips and a slip prepared by a particular person (for example, Yumiko Suzuki) is to be searched from the slips, the operator designates a search condition by an interactive operation by using a screen shown in FIG. 30. The name of slip to be searched may include a wild card. In the present embodiment, the slip which has "ordering slip" at the head of the name is to be searched. The item to be searched is not limited to the slip name but the slip to be searched may be stored in the binder shown in the embodiment of the totalization process and the entire slip stored in the binder may be designated as the object of search. The extent of search is not limited to its own work station but it may be expanded to all work stations connected to the network, or the slips or binder held by a particular work station connected to the network may be designated. In the present embodiment, the slips and the binder held by its own work station are designated.

Figure 31:
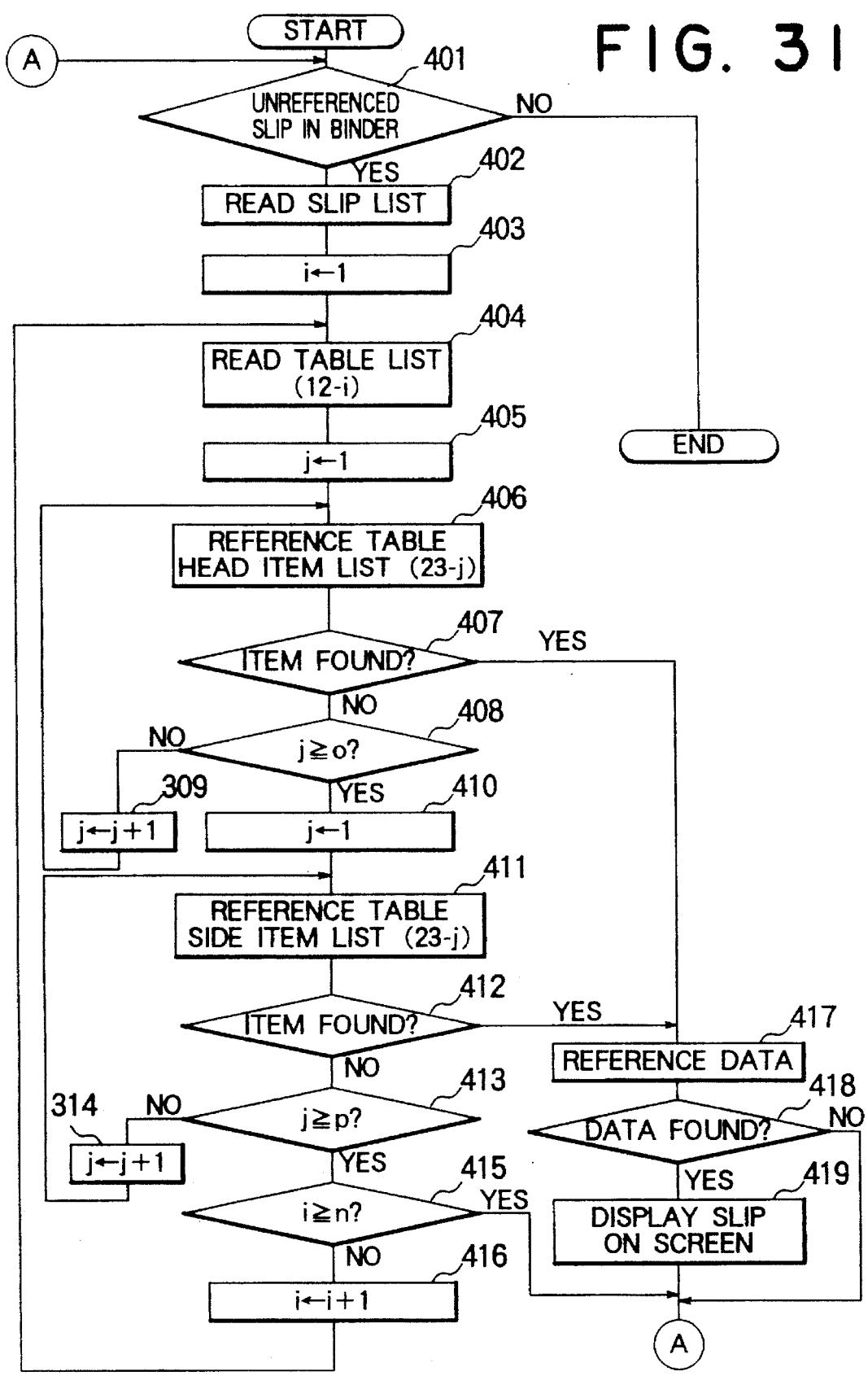

Then, the item name to be searched and the search condition are designated. A process after the setting of the search condition as shown in FIG. 30 is shown in a flow chart of FIG. 31, and explanation is made with reference to FIG. 31.

Step 401: The presence or absence of unreferenced slip in the slips to be searched is determined. In FIG. 23, there are two items to be searched, the ordering slip and the ordering slip-B. Explanation is made based on the ordering slip-B shown in FIG. 29.

Step 402: The slip list of the slip to be referenced is referenced. In the step 402, the slip information 120 is referenced.

Step 403: "1" is set in the counter of the table list. The count of the counter of the table list is stored in a variable i.

Step 404: The table list is read. In the step 404, the table list 121-$i$ is read.

Step 405: "1" is et in the counter of the item list. The count of the counter of the item list is store in a variable j.

Step 406: The table head item list is referenced. In the step 406, the table head item list 123-$j$ is referenced.

Step 407: Whether the item name 216 matches to the item name under search or not is determined. In the present embodiment, "Person in charge" is searched. If the item name matches, the data information is referenced in a step 417.

Step 408: If there is no matching item name in the step 407, whether there is unreferenced table head item list or not is determined.

Step 409: If there is unreferenced table head item list in the step 408, the count j of the item counter is incremented by one and the process returns to the step 406.

Step 410: If there is no unreferenced table head item list in the step 408, the item counter is one.

Step 411: If the desired item is not detected from the table head item list, the table side item list is referenced.

Step 412: Whether the item name matches to the item name under search or not is determined. In the present embodiment, "Person in charge" is searched. If the item name matches, the data information is referenced in the process after the step 417 and data is set, and the process returns to the step 401.

Step 413: If there is no matching item name in the step 412, whether there is unreferenced table head item list or not is determined.

Step 414: If there is unreferenced table head item list in the step 413, the item counter is incremented by one (j←j+1) and the process returns to the step 411.

step 415: If there is no unreferenced table head item list in the step 414, whether there is unread table list or not is determined. If there is no unread table list, the process returns to the step 401.

Step 416: If there is unread table list in the step 415, the table counter is incremented by one (i←i+1) and the process returns to the step 404.

Step 417: The content of the pointer of the data information of the table head item list or the table side item list is referenced. In the present embodiment, the item 207 is referenced and the name of the person in charge of each slip is acquired.

Step 418: Whether the result of the reference of data in the step 417 matches to the data under search or not is determined. In the present embodiment, whether the data is "Yumiko Suzuki" or not is determined. If they match, the process proceeds to a step 419, and if they do not match, the process returns to the step 401.

Step 419: The format and data of the slip are displayed on the screen.

In FIG. 30, when other work station is designated, the slip transfer unit 79 of FIG. 10 transmits the search condition to that work station. When the work station receives the search condition, it starts the slip input system 77 and executes the search in the information interpretation execution system of a processing 115. In the present invention, the similar process may be performed to the slip on the work station connected by the network.

Modification 2 (Combination of slip entry unit and slip transfer unit):

In FIG. 2, it is assumed that the slip issuer-A 35 requests the ordering of spare and the totalization terminal 33 is in a procurement department. The slip issuer-A 35 enters the amount of money of the spare by a price but the procurement department does not need the price information but needs actual purchasing price. In this case, the slip processing may be requested from the totalization terminal 33 to the slip entry terminal-A 31. Since the content of the processing is described in the text data, it is not necessary to pay attention to the type of work station.

In FIG. 32, the user designates an ordering slip * as a slip to be processed, from the totalization terminal, with the designation of a particular work station as an extent of process and sets "amount of money" as the item name to be processed and "amount of money * 0.8" as the content of processing. When the user transmits the content shown in FIG. 32 from the totalization terminal 33 to the slip entry terminal-A 31, the slip entry unit of the slip entry terminal-A 31 is started and the processing formula information interpretation execution unit references the transmitted content to execute the process. In the present invention, the processing information as shown in FIGS. 30 and 32 is transmitted to the corresponding work station and the processing of the slips of the other work station is performed.

Modification 3 (Combination of slip entry unit and slip transmission system):

In certain job, the slip is circulated among a plurality of work stations through the network and reviewers enter comments to the circulated slip. Usually, only the text data can be circulated among the work stations of different types and the edition of the circulated slip is not attained. In the present invention, since the format information is also held in the text data, the edition modification of the data on t he computers of different types are allowed and the circulation of the slip with the format data is allowed.

In the present invention, the format and data are managed individually for each slip and the content of data may be referenced from the item name. Accordingly, the item name may be processed by referencing the data as the interface for the slips of different format. In the quasi-formatted job, the frequency of change of the format of the slip is high and the data of slips of different formats are frequently totalized. Since the totalization of the data of the slips of different formats, which has heretofore been manually processed may be processed on the computer, the computerization of the quasi-formatted job with a reasonable cost is attained. Since the format and data are stored in the text data, the processing by the work station of other type through the network is attained.

In accordance with the present invention, since the format and data, and the content of processing are independently managed, the content of processing may be copied from the existing one even if the format of the slip is changed.

In the actual job, the present invention is also useful in the office processing which is in a field of formatted job. For example, a content of processing of the sale slip used in retail business is essentially common to all users. However, since the standardization of the format is not well proceeded, the format is different from user to user. In the retail business, a format of the slip used for transaction is determined by the dominance between the retailer and the supplier. If the retailer is more dominant, the supplier is required to prepare a sale slip of different format for each retailer. When the supplier totalizes the slips to determine the total of the sale slips, the total must be calculated for each format of the slip and a sum of the totals calculated for the different type of slips must be calculated. In accordance with the present invention, however, the user needs only designate the slips to be totalized and the user need not pay attention to the difference of the types of format in the totalization process. The totalization may also be performed for the slips of the same format. Further, since the database is not used, the change of the format of the slip may be readily accepted if a customer requests it. In accordance with the present invention, the efficiency of the processing of the quasi-formatted job is improved, and for the formatted job in which the efficiency of the processing has already been improved, the efficiency of production of software is improved because a shorter time is required for the modification of the specification such as the change of the format of the slip.

What is claimed is:

1. A slip processing method for processing a plurality of slips used in an office processing job utilizing a computer system having an input port and a storage medium, comprising the steps of:
   a) storing slip data in said plurality of slips into said storage medium, wherein said slip data in each of the said slips includes format definition information and data in a text format independent of said computer system;
   b) searching said format definition information in each said slip data by an item and a retrieval condition and retrieving desired data from each said slip in accordance with said item and said retrieval condition, wherein said item and said retrieval condition are included in a new format definition information inputted by said input port;
   c) totalizing said desired data using a processing formula included in said new format definition information for generating a totalization data; and
   d) storing said totalization data and said new format definition information as new slip data in a new slip in said storage medium.

2. A slip processing method for processing a plurality of slips used in an office processing job in a computer system having a plurality of computers each including an input port and a storage medium wherein each of the said computers is connected to the other computers using communication connections, comprising the steps of:
   a) transmitting slip data wherein each slip data includes format definition information and data which are stored in said storage medium in a text format independent of the computer system, wherein the format definition information and data are provided by a plurality of first computers to a second computer through said communication connections for storing said format definition information and data in said storage medium of said second computer; and
   b) executing the following steps by said second computer;
   b-1) searching said format definition information in each said slip data by an item and a retrieval condition and retrieving desired data from each said slip data in accordance with said item and said retrieval condition, wherein said item and said retrieval condition are included in a new format definition information inputted by said input port;
   b-2) totalizing said desired data using a processing formula included in said new format definition information for generating a totalization data; and
   b-3) storing said totalization data and said new format definition information as new slip data in a new slip in said storage medium.

3. A slip processing method for processing a plurality of slips used in an office processing job in a computer system having a plurality of computers each computer including input ports and storage medium wherein each of the said computers is connected to the other computers through communication connections, comprising the steps of:
   a) transmitting slip data wherein each slip data includes format definition information and data which are stored in said storage medium in a text format independent of the computer system wherein the format definition information and data are provided by a first computer to a plurality of second computers through said communication connections for storing each transmitted format definition information and data in said storage medium of each of the plurality of second computers;
   b) executing the following steps by each of said second computers;
   b-1) searching said format definition information in each said slip data by an item and a retrieval condition and retrieving desired data from each said slip data in accordance with said item and said retrieval condition, wherein said item and said retrieval condition are included in a new format definition information inputted by said input port of each of the second computers;
   b-2) totalizing said desired data using a processing formula included in said new format definition information for generating a totalization data; and
   b-3) storing said totalization data and said new format definition information as new slip data in a new slip in said storage medium of each of the second computers; and
   c) transmitting said new slip data from each of the second computers to said first computer.

4. A slip processing method for processing a plurality of slips used in an office processing job in a computer system having a plurality of computers each computer including input ports and storage medium wherein each of the said computers is connected to the other computers through communication connections, comprising the steps of:
   a) transmitting slip data wherein each slip data includes format definition information and data which are stored in said storage medium in a text format independent of the computer system wherein the format definition information and data are provided by a first computer to a second computer through said communication connections for storing said transmitted format definition information and data in said storage medium of said second computer;

b) executing the following steps by said second computer;

b-1) searching said format definition information in each said slip data by an item and a retrieval condition and retrieving desired data from each said slip data in accordance with said item and said retrieval condition, wherein said item and said retrieval condition are included in a new format definition information inputted by said input port of said second computer;

b-2) totalizing said desired data using a processing formula included in said new format definition information for generating a totalization data; and b-3) storing said totalization data and said new format definition information as new slip data in a new slip in said storage medium of said second computer; and c) transmitting said new slip data from said second computer to said first computer.

5. The method of claim 1 wherein each of the slips include at least one table and a character string.

6. The method of claim 5 wherein the table includes at least one item.

7. The method of claim 5 wherein the format definition information includes:

a slip information including the size and name of the slip;

a table list including information on the sizes and positions of tables in the slip;

an item list containing information regarding items in the tables; and, a character area list which contains information on the character string.

8. The method of claim 2 wherein each of the slips include at least one table and a character string.

9. The method of claim 8 wherein the table includes at least one item.

10. The method of claim 9 wherein the format definition information includes:

a slip information including the size and name of the slip;

a table list including information on the sizes and positions of tables in the slip;

an item list containing information regarding items in the tables; and, a character area list which contains information on the character string.

11. The method of claim 3 wherein each of the slips include at least one table and a character string.

12. The method of claim 11 wherein the table includes at least one item.

13. The method of claim 12 wherein the format definition information includes:

a slip information including the size and name of the slip;

a table list including information on the sizes and positions of tables in the slip;

an item list containing information regarding items in the tables; and, a character area list which contains information on the character string.

14. The method of claim 4 wherein each of the slips include at least one table and a character string.

15. The method of claim 14 wherein the table includes at least one item.

16. The method of claim 15 wherein the format definition information includes:

a slip information including the size and name of the slip;

a table list including information on the sizes and positions of tables in the slip;

an item list containing information regarding items in the tables; and, a character area list which contains information on the character string.

* * * * *